United States Patent [19]

Takada et al.

[11] Patent Number: 4,735,988
[45] Date of Patent: Apr. 5, 1988

[54] PROPYLENE POLYMER COMPOSITION

[75] Inventors: Tomio Takada, Kawasaki; Tsutomu Suda, Inagi; Mitsunobu Machida, Kawasaki; Yozo Nagai, Tokyo; Minoru Takaishi, Inagi; Noboru Takagi, Kawasaki, all of Japan

[73] Assignee: Showa Denko Kabushiki Kaisha, Tokyo, Japan

[21] Appl. No.: 867,724

[22] Filed: May 28, 1986

[30] Foreign Application Priority Data

| May 28, 1985 | [JP] | Japan | 60-113279 |
| Sep. 17, 1985 | [JP] | Japan | 60-203498 |
| Nov. 20, 1985 | [JP] | Japan | 60-258606 |
| Mar. 7, 1986 | [JP] | Japan | 61-48619 |

[51] Int. Cl.$^4$ .................... C08K 3/00; C08K 3/34; C08K 3/26
[52] U.S. Cl. .................... 524/504; 524/426; 524/427; 524/451; 524/456; 524/505; 525/75; 525/79
[58] Field of Search .............. 524/504, 505, 456, 451, 524/426, 427; 525/79, 75

[56] References Cited

FOREIGN PATENT DOCUMENTS

| 58-111846 | 7/1983 | Japan . |
| 58-191706 | 11/1983 | Japan . |
| 58-219244 | 12/1983 | Japan . |
| 59-26258 | 2/1984 | Japan . |
| 59-196344 | 11/1984 | Japan . |
| 59-204642 | 11/1984 | Japan . |
| 60-49045 | 3/1985 | Japan . |
| 60-49046 | 3/1985 | Japan . |

OTHER PUBLICATIONS

Derwent Abs. 85-113504/19 (C85-049178), Mar. 29, 1985, Showa Denko KK, J60055012.
Derwent Abs. 85-113535/19 (C85-049209), Mar. 29, 1985, Showa Denko KK, J60055052.
Derwent Abs. 85-118752/20 (C85-051384), Apr. 4, 1985, Showa Denko KK, J60058410.
Derwent Abs. 84-309751/50, Nov. 2, 1984, J59193942, Showa.
Derwent Abs. 84-297441/48, Oct. 19, 1984, J59184247, Showa.

Primary Examiner—Herbert J. Lilling
Attorney, Agent, or Firm—Sughrue, Mion, Zinn, Macpeak, and Seas

[57] ABSTRACT

A propylene polymer composition comprising (A) a modified propylene polymer obtained by treating: (1) 100 parts by weight of a propylene polymer or a mixture of a propylene homopolymer and a ethylene-propylene copolymer rubber, with (2) 0.1 to 50 parts by weight of an organic compound having at least one unsaturated bond in the molecule and a hydroxyl group and (3) 0.01 to 20 parts by weight of an organic peroxide; and (B) a propylene polymer, wherein content of the component (A) in the composition is 5 to 50% by weight. This composition may further contain one or more of (C) an amorphous ethylene-propylene copolymer having a propylene content of 20% to 50% by weight and a Mooney viscosity $ML_{1+4}$ at 100° C. of 20 to 100, (D) a high-density ethylene copolymer having a density of 0.935 g/cm$^3$ or more, (E) a linear low-density ethylene copolymer having a density of not less than 0.900 g/cm$^3$ but less than 0.935 g/cm$^2$, a melting point of 106° C. to 130 C., a melt flow rate of 0.01 to 100 g/10 min. and substantially having 3 to 35, based on 1,000 carbon atoms of the backbone carbon chain, of the side-chain alkyl groups having 1 to 10 carbon atoms, and (F) an inorganic filler.

The resultant composition has not only an excellent adhesion to polyurethane without the use of a primer, but also has a good weathering resistance.

5 Claims, No Drawings

PROPYLENE POLYMER COMPOSITION

BACKGROUND OF THE INVENTION

1. Field of the Invention

The present invention relates to a propylene polymer composition which has not only an excellent adhesion to polyurethane without the use of a primer, but also has a good weathering resistance. More specifically, the present invention relates to a propylene polymer composition which comprises (A) a modified propylene polymer obtained by treating (1) a propylene polymer or a mixture of a propylene homopolymer and a ethylene-propylene copolymer rubber with (2) an organic compound having at least one unsaturated bond in the molecule and a hydroxyl group and (3) an organic peroxide and (B) a propylene polymer, and may further comprises one or more of (C) an amorphous ethylene-propylene copolymer having a propylene content of 20% to 50% by weight and a Mooney viscosity at $ML_{1+4}$ at 100° C. of 20 to 100, (D) a high-density ethylene polymer having a density of 0.935 g/cm$^2$ or more, (E) a linear low-density ethylene copolymer having a density of not less than 0.900 g/cm$^3$ but less than 0.935 g/cm$^2$, a melting point of 106° C. to 130° C., a melt flow rate of 0.01 to 100 g/10 min and substantially having 3 to 35, based on 1000 carbon atoms of the backbone carbon chain, of the side-chain alkyl groups having 1 to 10 carbon atoms, and (F) an inorganic filler. The resultant propylene polymer composition not only has excellent mechanical characteristics such as rigidity and impact resistance, but also has an excellent adhesion to polyurethane without the use of a primer. Furthermore, when the high-density ethylene polymer and/or the linear low-density ethylene copolymer are incorporated into the composition, an excellent usual appearance, especially an excellent glossiness can be obtained.

2. Description of the Related Art

As is well known, propylene polymers (propylene homopolymers, propylene copolymers) not only have an excellent moldability but also have good mechanical characteristics, heat resistance, solvent resistance, oil resistance, and chemical resistance, and therefore, are produced widely in industry and utilized in various fields such as industrial parts for automobiles, electrical instruments, and electrical machines, as well as commodities. However, since the molecules thereof have no polar group (so called non-polar type), they have a poor adhesion to polyurethanes and thus various problems arise. These problems are described herein by referring to bumpers for automobiles, as widely utilized, by way of example.

Heretofore, bumpers made of metals or polyurethanes have been widely used. In recent years, due to the demands for weight reductions and cost-reductions of automobiles, bumpers made of propylene polymers (propylene homopolymers, ethylene-propylene random or block copolymers) or a composition mainly comprising propylene polymers have been widely utilized. These bumpers are frequently used after a previous embossing as originally attached without the application of a coating. However, to impart a further brilliance and a sense of high quality, in many cases the bumpers are mounted on cars after the application of a coating of a polyurethane coating material which is in line with the increasing demand for higher quality automobiles.

However, the molecules of propylene polymers have no polar group, as mentioned above, and thus are chemically very inactive polymeric substances. Therefore, when coating a polyurethane, it is well known in the art to apply a pretreatment to the molded product, such as an electrical treatment (e.g., corona discharge treatment, plasma treatment), mechanical surface roughening, flame treatment, and oxygen or ozone treatment. Further, prior to these surface treatments, it is recommended to wash the surface with a solvent such as an alcohol or aromatic hydrocarbon. Further, it is known to dip the molded product in an organic solvent such as 1.1.1-trichloroethane, perchloroethylene, pentachloroethylene, etc., at a temperature near boiling point or expose it to a solvent vapor (for example, "Course of Plastic Materials Vol. 7, Polypropylene Resin", p. 218 to 219, ed. by Kaneyuki Takagi & Heizo Sasaki, 1969, published by Nikkan Kogyo Shimbun K. K.). However, according to these methods, not only is a special treatment equipment required, but also a considerable time is required for such treatment.

Further, according to current practice, the molded product (bumper) is applied with a sub-coating of a primer which will adhere to the propylene polymer and a polyurethane coating material is applied as the top coating. That is, the following steps are required; primer sub-coating→baking→polyurethane coating-→baking (2 coats-2 bakings or 3 coats-2 bakings), and the coating steps require a long time (usually about 1 hour and 30 minutes). For this reason, the coating cycle is prolonged the production of bumpers coated with polyurethane, whereby not only is bulk production rendered difficult but also the cost is increased.

In the production of other automobile parts, tricycle parts, electrical instrument parts, and electronic instrument parts, similar problems are involved when propylene polymers are employed and coated with polyurethane, although the coating method may be different.

In general, polypropylene polymers or compositions thereof utilized for bumpers, etc., incorporate UV-absorbers, UV-stabilizers, and antioxidants, etc., according to a combination of any desired recipe, for a reinforcement of the weathering resistance. After several years of actual use, however, the surface of the molded product will be discolored or chalking or cracks may form thereon. Thus, a satisfactory result cannot be obtained under the present situation. Further, there is an increasing demand for a better grade of bumper, particularly as the taste for higher quality cars is augmented and the frequency of use in bad weather areas increases.

Accordingly, to cope with such a trend, it may be considered to increase the amount of weather-resistant formulation or add new additives. However, a mere increase in the amount or addition of these may cause problems in appearance in molding (e.g., lustre irregularity or whitening of the surface), or the increased amount of or newly added additives may bleed out on the surface of the molding to worsen the appearance or result in whitening of the surface of the molded product after prolonged actual usage.

SUMMARY OF THE INVENTION

Accordingly, the objects of the present invention are to eliminate the above-mentioned disadvantages of the prior art and to provide a propylene polymer composition capable of not only retaining or improving various mechanical characteristics possessed by polypropylene polymer (e.g., impact strength, rigidity), but also having a good moldability, an excellent weathering resistance, and at the same time, will adhere to polyurethanes without the use of a primer.

Another object of the present invention is to provide a propylene polymer composition capable of providing an excellent gloss to, for example, the molded products.

Other objects and advantages of the present invention will be apparent from the following description.

In accordance with the present invention, there is provided a propylene polymer composition comprising:

(A) a modified propylene polymer obtained by treating:

(1) 100 parts by weight of a propylene polymer or a mixture of a propylene polymer and a ethylene-propylene copolymer rubber, with (2) 0.1 to 50 parts by weight of an organic compound having at least one unsaturated bond in the molecule and a hydroxyl group and (3) 0.01 to 20 parts by weight of an organic peroxide; and (B) a propylene polymer, wherein the content of the component (A) in the composition is 5 to 50% by weight.

DESCRIPTION OF THE PREFERRED EMBODIMENTS

The present invention will now be explained in detail.

(A) Modified Propylene Polymer

The modified propylene polymer in the present invention is obtained by treating a propylene polymer or a mixture of a propylene polymer with an ethylene-propylene copolymer rubber as hereinafter described with the hydroxyl compound and an organic peroxide compound, and the process for production thereof is described in detail in Japanese Unexamined Patent Publication (Kokai) No. 58-154732.

(1) Propylene Polymer

The propylene polymer usable for the preparation of the modified propylene polymer of the present invention is selected from propylene homopolymers, block copolymers mainly composed of propylene with ethylene and/or α-olefins and random copolymers mainly composed of propylene with ethylene and/or α-olefins. Also, in these block copolymers and random copolymers, the ratio of ethylene and α-olefins copolymerized is at most 20% by weight (preferably 15% by weight or less) as the total amount. Further, the α-olefins have 4 to 12 carbon atoms. Typical examples of the α-olefins include butene-1, hexene-1, 4-methylhexene-1 and octene-1.

These propylene polymers are produced in industry and utilized in a variety of fields. Also, the physical properties and production processes of these propylene polymers are well known in the art.

It is also possible to use a mixture of a propylene homopolymer with an ethylene-propylene copolymer rubber as described below at a ratio as specified below in place of the propylene polymer. In this case, the ethylene-propylene copolymer rubber is composed mainly of ethylene and propylene. Such ethylene-propylene copolymer rubbers are classified broadly into copolymer rubbers obtained by copolymerization of ethylene and propylene and multi-component copolymer rubbers obtained by copolymerization of ethylene and propylene as the main components with small amounts (generally not more than 10% by weight) of straight or branched diolefins having two double bonds at the ends such as 1,4-pentadiene, 1,5-hexadiene and 3,3-dimethyl-1,5-hexadiene; straight or branched diolefins containing a double bond at the end such as 1,4-hexadiene and 6-methyl-1,5-heptadiene; or monomers having double bonds such as cyclic diene hydrocarbons (e.g., bicyclo[2,2,1]-heptene-2(norbornene)) or derivatives thereof (e.g., ethylidene norbornene). In either the case of the copolymer rubber or the case of the multi-component copolymer rubber, the propylene content is 20 to 50% by weight and a Mooney viscosity $[ML_{1+4}(100°\ C.)]$ of 10 to 50, preferably 10 to 40, particularly preferably 15 to 40. When an ethylene-propylene copolymer rubber has a Mooney viscosity of less than 10, although the moldability is good, an improvement of the adhesion strength to a urethane coating material as described below cannot be satisfactorily effected. On the other hand, when a copolymer with a Mooney viscosity of over 50 is used, flow marks or other defects may be generated on the surface of a molding to give an undesirable appearance.

In producing the modified propylene polymer of the present invention, the ratio of the ethylene-propylene copolymer rubber in the total amount of the above propylene homopolymer and the ethylene-propylene copolymer rubber is generally at most 40% by weight, desirably 1 to 40% by weight, particularly preferably 2 to 35% by weight. If the ratio of the ethylene-propylene copolymer rubber in the total amount of the above propylene homopolymer and the ethylene-propylene copolymer rubber exceeds 40% by weight, although the adhesion strength to the coating is good, not only are flow marks generated on the surface of a molding, but also the lustre is degraded.

The propylene polymer should preferably have a melt flow rate (measured according to ASTM D 1238 under the condition L; hereinafter called "MFR (1)") generally of 0.01 to 100 g/10 min., preferably 0.01 to 80 g/10 min., more preferably 0.02 to 60 g/10 min., in view of the moldability and mechanical characteristics of the composition obtained.

(2) Hydroxyl Compound

The hydroxyl compound is a compound having at least one unsaturated bond (double bond, triple bond) and a hydroxyl group. Examples of the hydroxyl compound include alcohols having 3 to 10 carbon atoms and having double bonds, alcohols having 3 to 10 carbon atoms having triple bonds, esters of unsaturated mono- or di-carboxylic acids having 3 to 24 carbon atoms with unsubstituted dihydric alcohols having 3 to 10 carbon atoms, esters of said unsaturated carboxylic acids with unsubstituted trihydric alcohols, unsubstituted tetrahydric alcohols and unsubstituted penta- or higher polyhydric alcohols each having 3 to 10 carbon atoms. Typical examples of such hydroxyl compounds are 2-hydroxyethyl(meth)acrylate, 2-hydroxypropyl(meth)acrylate, and 2-hydroxybutyl(meth)acrylate.

(3) Organic Peroxide

The organic peroxide may include those generally used as the initiator in radical polymerization and the crosslinking agent of a polymer, preferably one having a temperature for a half-life period of one minute of 100° C. or higher, most preferably 130° C. or higher. If the above temperature is lower than 100° C., not only is handling of the peroxide difficult, but also an appreciable effect of its use cannot be recognized. Typical examples of such organic peroxide are ketone peroxides such as 1,1-bis-tert-butylperoxy-3,3,5-trimethylcyclohexane, dialkyl peroxides such as dicumyl peroxide, hydroperoxides such as 2,5-dimethylhexane-2,5-hydroperoxide, diacyl peroxides such as benzoyl peroxide, and peroxy esters such as 2,5-dimethyl-2,5-dibenzoyl peroxyhexane.

In the preparation of the mixture of the present invention, the mixing ratio of the hydroxyl compound per 100 parts by weight of the propylene polymer is 0.1 to 50 parts by weight, preferably 0.2 to 30 parts by weight, particularly 0.3 to 20 parts by weight. At a level lower than 0.1 part by weight of the hydroxyl compound per 100 parts by weight of the propylene polymer, only an insufficient adhesion improvement effect can be obtained. On the other hand, even if an amount of over 50 parts by weight is used, a further improvement effect proportional to the amount used cannot be recognized, but rather the characteristics inherent in the propylene homopolymer may be undesirably impaired.

The mixing ratio of the organic peroxide per 100 parts by weight of the propylene polymer is 0.01 to 20 parts by weight, desirably 0.05 to 10 parts by weight, particularly 0.1 to 7 parts by weight, particularly 0.1 to 7 parts by weight. With an amount of less than 0.01 part by weight of the organic peroxide per 100 parts by weight of the propylene polymer, not only is the improvement of the adhesion effect low, but also the durability or the adhesion strength of the mixture is reduced. On the other hand, an excessive amount of over 20 parts by weight will result in a lowering of the mechanical characteristics inherently possessed by the polymer. Thus, ratios outside the specified range are not desirable in either case.

The modified propylene polymer of the present invention can be produced by treating (or heating) the propylene polymer, the hydroxyl compound, and the organic peroxide as described above at a mixing ratio as specified above. In this case, treatment may be carried out while mixing the propylene polymer, the hydroxyl compound and the organic peroxide, or alternatively these may be previously mixed by way of dry blending or kneaded at a relatively lower temperature (at which the hydroxyl compound is not reactive) before heating the resultant mixture as described below.

When treatment is carried out at a high temperature, the propylene polymer may be sometimes degraded, nevertheless, the treatment must be carried out at a temperature at which the organic peroxide used for graft polymerization of the propylene polymer and the hydroxyl compound employed can be decomposed. For the above reasons, the treatment is carried out generally at 160° to 300° C., preferably 170° to 280° C., although this may differ depending on the organic peroxide employed.

The general formulae and typical examples of the above-mentioned hydroxyl compounds and organic peroxides as well as the mixing methods and treating methods are also described in Japanese Unexamined Patent Publication (Kokai) No. 58-154732. That is, the compositions may be dry blended by using any conventional dry mixer or blender such as a Henschel mixer or may be melt kneaded by using any conventional mixing apparatus such as a Banbury mixer, kneader, roll mill, or screw-type extruder. The compositions may be preferably prepared by first dry blending, followed by the melt kneading. Thus, the more uniform compositions can be obtained. Although there are no critical limitations to the blending or kneading temperature, the use of too a high temperature tends to cause the detrioration of the olefin polymers. However the neading should be conducted at a temperature sufficient to cause the desired graft polymerization between the olefin copolymers and the hydroxyl compounds, that is, at a temperature at which the organic peroxides can be decomposed. The typical melt kneading temperature is 160° C. to 300° C.

(B) Propylene Polymer

The propylene polymer usable, together with the modified propylene polymer, in the composition of the present invention is the same as the propylene polymer used in the preparation of the above modified propylene polymer except for MFR (1) (however, it is not necessarily the same as that employed in preparation of the modified propylene polymer). Of these propylene polymers, block copolymers and random copolymers may be preferably used.

The propylene polymer has an MFR (1), generally, of 1.0 to 100 g/10 min., desirably 1.0 to 80 g/10 min., particularly preferably 2.0 to 60 g/10 min. If a propylene polymer having an MFR (1) lower than 1.0 g/10 min. is used, not only will it be poorly kneaded with the above modified propylene polymer, but also the resultant composition obtained will not have a good moldability. On the other hand, with the use of a propylene polymer having an MFR (1) of over 100 g/10 min., the resultant composition has a poor mechanical strength.

(C) Ethylene Propylene Copolymer Rubber

The ethylene-propylene copolymer rubber usable as the component (C) in the present invention are these having a propylene content of 20% to 50% by weight and a Mooney viscosity $ML_{1+4}$ at 100° C. of 20 to 100, preferably 20 to 80, more preferably 30 to 75.

When the Mooney viscosity of the ethylene-propylene copolymer rubber is smaller than 20, the separation of the layers is likely to occur when cutting the gate although the processability is improved. Contrary to this, when the Mooney viscosity is larger than 100, the uniform dispersion becomes difficult when mixing or blending with the other components and, furthermore, the generation of the so-called flow mark and weld line on the surface of the molded products is noticeable even if the uniform dispersion can be effected.

The preferable propylene content of the ethylene-propylene copolymer rubber (i.e., the component (C)) is, generally, 20% to 50% by weight, preferably 25% to 45% by weight, and more preferably 25% to 40% by weight. As is well-known in the art, the ethylene-propylene copolymer rubber has elastic or rubbery characteristics and is industrially utilized in various fields. The production processes thereof are also well-known in the art. The ethylene-propylene copolymer rubber according to the present invention includes (i) copolymer rubber obtained by copolymerizing ethylene and propylene and (ii) multi-copolymer rubber obtained by copolymerizing ethylene and propylene, as the main constituent, with a minor amount (e.g., 10% by weight or less) of comonomers having double bonds such as linear or branched diolefins having two double bonds in the terminal thereof (e.g., 1,4-pentadiene, 1,5-hexadiene, and 3,3-dimethyl-1,5-hexadiene), linear or branched diolefins having at least two double bonds in the molecule provided that at least one double bond is in the terminal thereof and at least one double bond is in the internal thereof (e.g., 1,4-hexadiene and 6-methyl-1,5-heptadiene), and cyclic diene hydrocarbons (e.g., bicyclo 2,2,1-heptene-2, i.e., norbornene) and the derivatives thereof (e.g., ethylidene norbornene).

(D) High-density Ethylene Polymer

The high-density polymers usable as the component (D) in the present invention are those having a density of 0.935 g/cm$^2$ or more, preferably 0.935 to 0.980 g/cm$^3$, more preferably, 0.935 to 0.975 g/cm$^3$. Such ethylene polymers generally include ethylene homopolymers and copolymers of ethylene with α-olefins (preferably having 3 to 12 carbon atoms, more preferably 3 to 8 carbon atoms). Preferable α-olefins are propylene, butene-1, hexene-1, 4-methylpentene-1, and octene-1.

The melt flow rate (i.e., MFR (2)), determined under the conditions E according to ASTM D 1238 method, of the high-density ethylene polymer is generally 0.1 to 100 g/10 min., preferably 0.5 to 80 g/10 min., more preferably, 1.0 to 60 g/10 min. When the MFR (2) of the ethylene polymer is less than 0.1 g/10 min., the uniform dispersion is difficult to obtain when mixing or blending with the other components and, furthermore, the generation of flow marks on the surface of the molded products is caused. Contrary to this, when the MFR (2) is more than 100 g/10 min., the uniform dispersion is again difficult to obtain when mixing or blending the other components and the impact strength of the resultant composition is decreased.

(E) Linear Low-density Ethylene Copolymer

The linear low-density ethylene copolymers usable as the component (E) in the present invention are those obtained by copolymerizing ethylene and α-olefins and having a density of not less than 0.900 g/cm$^3$ but less than 0.935 g/cm$^3$, preferably not less than 0.905 g/cm$^3$ but less than 0.935 g/cm$^3$. When the density of the linear low-density ethylene copolymer is less than 0.900 g/cm$^3$, the stiffness of the resultant composition is not sufficient. Contrary to this, when the density is 0.935 g/cm$^3$ or more, the flexibility of the resultant composition is insufficiently decreased although the stiffness is high.

The melting point of the linear low-density ethylene copolymer is generally 106° C. to 130° C., preferably 106° C. to 125° C., more preferably, 110° C. to 125° C. When the melting point of the linear low-density ethylene copolymer is lower than 106° C., the stiffness as well as the thermal resistance of the resultant composition tend to become insufficient. Contrary to this, when the melting point is higher than 130° C., the flexibility of the resultant composition tend to be decreased, although the stiffness is high. The MFR (2) (i.e., melt flow index, determined under the conditions E according to ASTM D 1238 method) of the linear low-density ethylene copolymer is generally 0.01 to 100 g/10min., preferably 0.1 to 50 g/10min., more preferably, 5 to 30 g/10min. When the MFR (2) of the linear low-density ethylene copolymer is less than 0.01 g/10 min, the moldability or processability of the resultant composition tends to decrease. When the MFR (2) is more than 100 g/10 min., an acceptable stiffness tends to be difficult to obtain although the moldability or processability is good.

The α-olefins usable in the production of the linear low-density ethylene copolymers generally include those having 12 or less carbon atoms. Typical examples of such α-olefins are propylene, butene-1, hexene-1, 4-methylpentene-1, and octene-1. The preferable copolymerization ratio of the α-olefin in the copolymer is 1.0% to 18% by weight.

The linear low-density ethylene copolymers usable in the present invention are those having a structure such that the number of the short-chain branch (i.e., side-chain alkyl groups having 1 to 10 carbon atoms) is 3 to 35, based on 1,000 carbon atoms of the backbone chain (i.e., main-chain).

(F) Inorganic Filler

The inorganic fillers usable as the component (F) in the present invention are those conventionally used in the fields of synthetic resins and rubber. They are inorganic compounds that do not react with oxygen and water. Preferably used are those fillers which are not decomposed during the process of kneading or molding. The inorganic fillers can be divided into groups: metals such as aluminum, copper, iron, lead, and nickel; compounds, such as oxides and their hydrated (hydroxides), sulfuric acid salts, carbonic acid salts, and silicic acid salts of the above metals and metals such a magnesium, calcium, barium, zinc, zirconium, molybdenum, silicon, antimony, and titanium; complex salts of the above metals; and mixtures thereof. Typical examples of these inorganic fillers are the above-described metals, aluminum oxide (alumina), their hydrates, calcium oxide, magnesium oxide (magnesia), magnesium hydroxide, zinc oxide, oxides of lead such as lead oxide red and lead oxide, magnesium carbonate, calcium carbonate, basic magnesium carbonate, white carbon, asbestos, mica, talc, glass fiber, glass powder, glass beads, clay, diatomaceous earth (kaolin clay), silica, wollastonite, iron oxide, antimony oxide, titanium oxide (titania), lithopone, pumice powder, aluminum sulfate (glypsum, for example), zirconium carbonate, zirconium oxide, barium carbonate, dolomite, molybdenum disulfide, and iron sand. In the case of powdered inorganic fillers, it is preferred that the diameter be 1 mm or less (with the range of from 0.5 mm or less being more preferred). In the case of fibrous inorganic fillers, it is preferred that the diameter be from 1 to 500 microns (with the range of from 1 to 300 microns being more preferred, and the length be from 0.1 to 6 mm (with the range of from 0.1 to 5 mm being more preferred). Further, in the case of plate-shaped inorganic fillers, it is preferred that the diameter be 2 mm or less (with the range of 1 mm or less being more preferred).

Of these inorganic filers, mica, talc, calcium carbonate, glass fiber, wollastonite are desirable in that they increase stiffness. Particularly preferred are talc, mica, and glass fiber. With regard to these inorganic fillers, details are described in "Encyclopedia", Vol. 6, pp. 740–763 and Vol. 6, pp. 610 to 690 (1976).

The formulation ratio of the modified propylene copolymer (A) in the composition of the present invention is 5.0 to 50% by weight, preferably 5.0 to 40% by weight, more preferably 7.0 to 40% by weight. When the amount of the modified propylene polymer (i.e., the component (A)) in the composition is less than 5% by weight, the resultant composition does not properly adhere to a polyurethane. On the other hand, even if formulated in an amount in excess of 50% by weight, a corresponding further improvement of the adhesion or of the weathering resistance cannot be obtained, but rather the resultant composition may have a poor mechanical strength.

The ethylene-propylene copolymer rubber (C) may be formulated into the present composition. The content of the component (C) in the compositions is generally 3% to 35% by weight, preferably 3% to 30% by weight, more preferably 5% to 30% by weight. When the content of the component (C) is less than 3% by weight, the impact resistance of the resultant polymer composition cannot be sufficiently improved. Contrary to this, when the content of the component (C) is more than 35% by weight, the stiffness of the resultant polymer composition is unpreferably decreased although the impact resistance is improved and the moldability or processability of the polymer composition tends to be impaired (e.g., flow marks and silver streaks are likely to be generated).

The high-density ethylene polymer (D) may be formulated into the present composition. The content of the component (D) in the composition, when used, is generally 3% to 25% by weight, preferably 3% to 20% by weight. When the content of the component (D) is less than 3% by weight, the disired improvements in the gloss and the impact resistance of the resultant polymer composition cannot be obtained. Contrary to this, when the content of the component (D) is more than 25% by weight, the thermal resistance of the polymer composition becomes poor and the inherent characteristics of the propylene polymer are impaired.

The linear low-density ethylene copolymer (E) may be formulated into the present composition. The content of the component (E) in the composition, when used, is generally 3% to 25% by weight, preferably 3% to 15% by weight. When the content of the component (E) is less than 3% by weight, the desired gloss cannot be obtained. Contrary to this, when the content of the component (E) is more than 25% by weight, the thermal resistance of the polymer composition becomes poor.

The inorganic filler (F) may be formulated into the present composition. The content of the component (F) in the composition, when used, is generally 2% to 40% by weight, preferably 3% to 30% by weight. When the content of the component (F) is less than 2% by weight, the stiffness of the polymer composition is not sufficiently improved. Contrary to this, when the content of the component (F) is more than 40% by weight, the generation of flow marks and silver streaks are likely to occur although the stiffness and dimension stability are improved.

When the components (A) and (B) are formurlated with one or more of the components (C), (D), (E), and (F), the content of the component (B) in the composition should be at least 15% by weight, preferably 15% to 85% by weight, more preferably 20% to 80% by weight and the weight ratio of the component (A) (2) to the total composition should be 0.01% to 10% by weight, preferably 0.02% to 10% by weight, more preferably 0.05% to 5% by weight to attain the objects of the present invention.

The present propylene composition may be prepared by any conventional method. For example, the above-mentioned component (A) and (B), and, if used, the other components (C), (D), (E), and/or (F) may be mixed homogeneously by applying the mixing method generally used in the field of olefin polymers so that the formulation ratio becomes within the range as specified above. In this case, all of the components formulated may be mixed at the same time, or alternatively, a part of the components may be mixed to prepare a so called masterbatch, followed by mixing of the masterbatch with the remainder of the components.

Furthermore, any conventional additives such as a stabilizer against heat, oxygen or UV-rays, metal degradation preventives, plasticizers, flame retardants, lubricants, fillers, colorants, antistatic agents and electrical characteristic improvers, which are generally formulated in olefin polymers, may be optionally formulated depending on the purpose of use of the composition, unless the physical properties of the composition are impaired thereby.

The composition thus obtained is generally molded into pellets and the desired molded products are prepared therefrom according to, for example, the injection molding or extrusion molding techniques, generally used in the fields of the respective thermoplastic resins.

When preparing the above composition, the temperature should be higher than the melting point of the polymers employed but should not cause thermal decomposition of the polymers, either in the case of melting and kneading or in the case of molding. The processing is generally practiced at 180° to 300° C., preferably 190° to 250° C.

Generally speaking, olefin polymers have a very poor adherence to polyurethanes, and therefore, when a molded product of an olefin polymer or its composition is used, a primer must be coated thereon and dried before the application of the polyurethane coating material. However, since the propylene polymer composition of the present invention has an excellent adhesion to polyurethanes, polyurethanes can be applied directly onto the surface of the molded product without coating the surface of the molded product with a primer (if a primer is used, adhesion can be further enhanced).

The propylene composition obtained by the present invention exhibits the following effects as compared with the propylene polymer composition of the prior art.

(1) The processability and moldability thereof is equal to or better than the prior art composition.

(2) The weathering resistance is good, as exhibited by the synergetic effect as mentioned above.

(3) It has an excellent adhesion to a polyurethane paint, and the subbing coating step of a primer can be omitted and the present composition coated directly on the surface of the polyurethane paint.

(4) By the application of an activation treatment generally practiced (e.g., corona discharge treatment, plasma treatment, UV-ray treatment) to the surface of a molded product, it is possible to attain a satisfactory adhesion to a polyurethane paint.

(5) The balanced properties of the stiffness and the impact resistance are improved.

(6) When the high-density ethylene polymer and/or the linear low-density ethylene copolymer is formulated into the composition, the gloss of the composition is remarkably improved.

The propylene polymer composition of the present invention, which can exhibit the effects mentioned above, can be utilized in a variety of fields. Typical uses may include outer decorative parts such as bumpers, bumper corners, etc., inner decorative parts such as door liners, etc., for automobiles, and parts for bikes such as fenders, etc.

EXAMPLE

The present invention will now be further, illustrated by, but is by no means limited to, the following Examples and Comparative Examples.

In the following Examples and Comparative Examples, the flexural modulus was measured according to ASTM D 790, the Izod impact strength according to ASTM D 256, and the coating adhesion strength by placing a flat test strip (thickness 2 mm, 130×130 mm) in 1,1,1-trichloroethane vapor for 30 seconds, thoroughly drying and then applying a high urethane coating material (produced by Nippon Chemical Co., trade name: R257, Solid) thereon to a dried thickness of 20 to 30 microns. After being left to stand for about 15 minutes, a urethane coating material (produced by Nippon Chemical Co., trade name: R266, Wacker Top) was applied to a dried thickness of 30 to 40 microns, followed by drying at 90° C. for 30 minutes. Subsequently, the sample was left to stand in a thermostat chamber (temperature 23° C., humidity 65%) for 48 hours. The resultant coated product (test strip) was cut to a 10 mm width, a part of the coating (about 10 mm) was forcibly peeled off, and thereafter, the remaining adhered portion was drawn in the direction opposite to the coating (at 180°) at a speed of 50 mm/min. by means of a tensile testing machine, to measure the peel-off strength. Further, a weathering resistance test was conducted by cutting the above flat test strip to 50 mm×50 mm, which was irradiated by means of a Sunshine Weather-o-meter (produced by Suga Shikenki) under the conditions of a black panel temperature of 83° C. and a rainfall condition of 12 min./80 min. Samples were taken out at respective irradiation times, and changes in appearance of the samples were observed and rated according to the following rankings.

⊚: no change
○: chalking slightly generated
Δ: cracks generated
x: cracks abundantly generated Furthermore, the gloss was determined by using the above-mentioned flat test strip according to an ASTM D 523 method.

The components (A) to (F) and stabilizers against heat, oxygen or UV-rays used in the Examples and Comparative Examples are shown below.

(1) Modified Propylene Polymer (i) For preparation of a modified propylene homopolymer, 85 parts by weight of a propylene homopolymer having an MFR (1) of 0.5 g/10 min. and 15 parts by weight of an ethylene-propylene copolymer rubber having a Mooney viscosity ($ML_{1+4}$, 100° C.) of 20 together with 30 parts by weight of 2-hydroxyethyl methacrylate and 0.7 parts by weight of 2,2'-bis (tert-butylperoxyisopropyl) benzene were previously dry-blended by means of a Henschel mixer for 5 minutes. The resultant mixture was kneaded by use of a vent-type extruder (diameter 85 mm, cylinder temperature 160°-200° C.), and the resultant product was used as the "modified PP(A)".

(ii) A 100 parts by weight of a propylene homopolymer having an MFR (1) of 0.5 g/10 min was dry blended with 4.0 parts by weight of 2-hydroxyethyl acrylate and 0.4 parts by weight of 2,2'-bis (tert-butyl peroxyisopropyl) benzene for 5 minutes in a Henschel mixer. The resultant blend was kneaded in a vent-type extruder (diameter 40 mm, cylinder temperature 160°-200° C.) to obtain the pellets (hereinafter called the "modified PP (B)").

(iii) A propylene homopolymer having an MFR of 0.5 g/10 min and amorphous ethylene-propylene copolymer rubber having an $ML_{1+4}$ of 20 at 100° C. were mixed in a ratio shown below. A 100 parts by weight of the resultant mixture was dry blended with 4.0 parts by weight of 2-hydroxyethyl acrylate and 1.0 part by weight of 2,2'-bis (tert-butyl peroxyisopropyl) benzene for 5 minutes in a Henschel mixer. The resultent blend was kneaded in a vent-type extruder (diameter 40 mm, cylinder temperature 160°-200° C.) to obtain the pellets. The resultant modified propylene polymers were used as the modified P.P. (C), (D), and (E) as follows.

| Amount (wt %) Used | | |
|---|---|---|
| Propylene hompolymer | Ethylene-propylene copolymer rubber | Abbreviation |
| 95 | 5 | Modified P.P. (C) |
| 70 | 30 | Modified P.P. (D) |
| 40 | 60 | Modified P.P. (E) |

(iv) As a comparative polymer, 100parts by weight of the above-mentioned propylene homopolymer was dry blended with 4.0 parts by weight of 2-hydroryethyl acrylate and 0.4 parts by weight of 2,2'-bis (tert-butyl peroxyisopropyl) benzene and the resultant blend was pelletized in the same manner as mentioned above. The resultant modified polymer was used as the "modified P.P. (F)".

(2) Propylene Polymer

The following propylene polymers were used.

(i) PP(A): An ethylene-propylene block copolymer having an ethylene content of 6.0% and an MFR(1) of 10 g/10 min.

(ii) PP(B): An ethylene-propylene block copolymer having an ethylene content of 8.8% and an MFR(1) of 15 g/10 min.

(iii) PP(C): An ethylene-propylene block copolymer having an ethylene content of 7.5% and an MFR(1) of 30 g/10 min.

(iv) PP(D): An ethylene-propylene block copolymer having an ethylene content of 10.1% and an MFR(1) of 28 g/10 min.

(v) PP(E): An ethylene-propylene block copolymer having an ethylene content of 10.1% and an MFR(1) of 1.5 g/10 min.

(vi) PP(F): An ethylene-propylene block copolymer having an ethylene content of 8.5% and an MFR (1) of 100 g/10 min.

(vii) PP(G): A propylene homopolymer having an MFR(1) of 10 g/10 min.

(viii) PP(H): An ethylene-propylene random copolymer having an ethylene content of 3.1% and an MFR(1) of 12 g/10 min.

(3) Ethylene-Propylene Random Copolymer Rubber

As the ethylene-propylene random copolymer rubber, an ethylene-propylene random copolymer having a propylene content of 27% by weight and an $ML_{1+4}$ of 35 at 100° C. (hereinafter called "EPR") was used.

(4) High-density Ethylene Polymer

As the high-density ethylene polymers, a high-density ethylene-butene-1 copolymer having a butene-1 content of 2% by weight, a density of 0.945, and an MFR(2) of 0.70 g/10 min (hereinafter called "HDPE(A)") and a high-density ethylene honopolymer having a density of 0.960 g/cm³ and an MFR(2) of 20 g/10 min (hereinafter called "HDPE(B)" were used.

(5) Linear Low-density Ethylene Copolymer

As the linear low-density ethylene copolymers, a linear low-density ethylene-butene-1 copolymer having a density of 0.918 g/cm³, an MFR(2) of 2.0 g/10 min, and seven side-chain alkyl (i.e., ethyl) groups per 1000 carbon atoms of the backbone carbon chain (hereinafter called "LLDPE(A)") and a linear low-density ethylene-butene-1 copolymer having a density of 0.921 g/cm³, an MFR(2) of 20 g/10 min, and six side-chain alkyl (i.e., ethyl) groups per 1000 carbon atoms of the backbone carbon chain (hereinafter called "LLDPE(B)") were used.

(6) Inorganic filler

As the inorganic filler, talc having a mean particle size of 2.0 microns, calcium carbonate ($CaCO_3$) having a mean particle size of 2.0 μm, and wollastonite having a mean particle size of 7.0 μm were employed.

(7) Stabilizer

As various stabilizers, bis (2,2,6,6-tetramethyl-4-piperidine sebacate (hereinafter called "Stabilizer (A)"), 2-(3-tert-butyl-5-methyl-2-hydroxyphenyl-5-chlorobenzotriazole (hereinafter called "Stabilizer (B)) and tetra (methylene-3-(3,5-di-tertbutyl-4-hydroxyphenyl) propionate) methane (hereinafter called "Stabilizer (C)") were employed.

Examples 1 to 10 and Comparative Examples 1 to 3

The modified propylene homopolymer (i.e., Modified PP(A), together with the ethylene-propylene block copolymer, the propylene homopolymer and ethylene-propylene random polymer (as PP resin) were mixed in the respective amounts formulated as indicated in Table 1 by means of a super mixer for 5 minutes. Each mixture obtained was kneaded into pellets (composition) through a vented twin screw extruder (cylinder temperature 180°–200° C., diameter 30 mm). The respective pellets were molded into flat plates (thickness 2 mm, 130×130 mm) and test strips, for measurement of the flexural modulus and Izod impact strength, by use of a 5-ounce injection molding machine. For the respective test strips obtained, measurements were carried out with respect to the coating adhesion strength, Izod impact strength (temperature 23° C.), weathering resistance test, and flexural modulus. The results are shown in Table 2.

From the results of the Examples and Comparative Examples, it can be clearly seen than the propylene polymer composition obtained according to the present invention not only has an excellent mechanical strength (flexural modulus, impact resistance) but also a good processability, and further, an excellent adhesion to polyurethanes. Further, the most salient effect is clearly the effect exhibited by an addition of stabilizers against heat, oxygen and UV-rays, which may be called a synergetic effect.

TABLE 1

| No. of Example or Comparative Example | Propylene polymer Kind | Propylene polymer Amount (wt. parts) | Amount of modified PP(A) (wt. parts) | Amount of talc (wt. parts) | Stabilizer (A) | Stabilizer (B) | Stabilizer (C) |
|---|---|---|---|---|---|---|---|
| Example 1 | A | 90 | 10 | 0.3 | 0 | 0 | 0 |
| Example 2 | " | 90 | 10 | 0.3 | 0.05 | 0.05 | 0.10 |
| Example 3 | " | 90 | 10 | 0.3 | 0.15 | 0.15 | 0.50 |
| Example 4 | " | 80 | 20 | 0.3 | 0.15 | 0.15 | 0.10 |
| Example 5 | " | 70 | 30 | 0.3 | 0.15 | 0.15 | 0.10 |
| Example 6 | " | 50 | 50 | 0.3 | 0.15 | 0.15 | 0.10 |
| Example 7 | E | 50 | 50 | 0.3 | 0.15 | 0.15 | 0.10 |
| Example 8 | F | 50 | 50 | 0 | 0.15 | 0.15 | 0.10 |
| Example 9 | G | 50 | 50 | 0.3 | 0.15 | 0.15 | 0.10 |
| Example 10 | H | 50 | 50 | 0.3 | 0.15 | 0.15 | 0.10 |
| Comparative Example 1 | A | 100 | 0 | 0 | 0 | 0 | 0 |
| Comparative Example 2 | " | 100 | 0 | 0 | 0.05 | 0.05 | 0.10 |
| Comparative Example 3 | " | 100 | 0 | 0 | 0.15 | 0.15 | 0.10 |

TABLE 2

| No. of Example or Comparative Example | MFR (g/10 min.) | Flexural modulus (Kg/cm²) | Izod impact strength[1] 23° C. (notched) | Weathering resistance, appearance evaluation irradiation time (hrs) 200 | 400 | 500 | 700 | 1000 | Coating adhesion strength (g/cm width) | Square test[2] (%) |
|---|---|---|---|---|---|---|---|---|---|---|
| Example 1 | 17.4 | 12,700 | 5.9 | ○ | x | x | — | — | 350 | 100 |
| Example 2 | 17.2 | 12,900 | 5.7 | ◎ | x | x | — | — | 360 | 100 |
| Example 3 | 17.6 | 12,600 | 6.0 | ◉ | ◎ | x | x | — | 350 | 100 |
| Example 4 | 20.3 | 11,900 | 7.2 | ◎ | ◎ | ◎ | x | x | 420 | 100 |
| Example 5 | 22.7 | 11,200 | 7.8 | ◎ | ◎ | ◎ | ○ | x | 510 | 100 |
| Example 6 | 38.5 | 10,100 | 8.8 | ◎ | ◎ | ◎ | ○ | x | 720 | 100 |
| Example 7 | 28.1 | 8,700 | 5.7 | ◎ | ◎ | ◎ | ○ | x | 680 | 100 |
| Example 8 | 98.7 | 12,700 | 2.5 | ◎ | ◎ | ○ | Δ | — | 780 | 100 |
| Example 9 | 30.5 | 11,800 | 4.7 | ◎ | ◎ | ○ | Δ | — | 420 | 100 |
| Example 10 | 31.2 | 9,100 | 5.8 | ◎ | ◎ | ○ | Δ | — | 510 | 100 |
| Comparative | 15.0 | 12,800 | 5.1 | x | x | — | — | — | 0 | 0 |

TABLE 2-continued

| No. of Example or Comparative Example | MFR (g/10 min.) | Flexural modulus (Kg/cm²) | Izod impact strength[1] 23° C. (notched) | Weathering resistance, appearance evaluation irradiation time (hrs) | | | | | Coating test Coating adhesion strength (g/cm width) | Square test[2] (%) |
|---|---|---|---|---|---|---|---|---|---|---|
| | | | | 200 | 400 | 500 | 700 | 1000 | | |
| Example 1 Comparative Example 2 | 15.5 | 12,600 | 5.3 | x | x | — | — | | 0 | 0 |
| Comparative Example 3 | 15.2 | 13,000 | 5.2 | ⊚ | x | x | — | | 0 | 0 |

[1]kg · cm/cm
[2]Residual percentage

Examples 11 to 21 and Comparative Examples 4 to 6

The propylene polymer compositions were prepared in the same manner as in Example 1, except that the propylene polymers, the modified propylene homopolymer, the amorphous etylene-propylene copolymer, and the stabilizers were used in the amounts listed in Table 3.

The results are shown in Table 4.

Examples 22 to 34 and Comparative Examples 7 to 9

The propylene polymer compositions were prepared in the same manner as in Example 1, except that the propylene polymers, the modified propylene homopolymer, the amorphous ethylene-propylene copolymers, and talc were used in the amounts listed in Table 5.

The results are shown in Table 6.

TABLE 3

| No. of Example or Comparative Example | Propylene polymer | | | | Amount of Modified | | Amount of Stabilizer (wt. parts) | | |
|---|---|---|---|---|---|---|---|---|---|
| | Kind | Amount (wt %) | Kind | Amount (wt %) | P.P.(A) (wt %) | EPR (wt %) | Stabilizer (A) | Stabilizer (B) | Stabilizer (C) |
| Comparative Example 4 | B | 90 | — | — | — | 10 | 0 | 0 | 0 |
| Comparative Example 5 | " | 90 | — | — | — | 10 | 0.05 | 0.05 | 0.1 |
| Comparative Example 6 | " | 90 | — | — | — | 10 | 0.15 | 0.15 | 0.1 |
| Example 11 | " | 80 | — | — | 10 | 10 | 0 | 0 | 0 |
| Example 12 | " | 80 | — | — | 10 | 10 | 0.05 | 0.05 | 0.1 |
| Example 13 | " | 80 | — | — | 10 | 10 | 0.15 | 0.15 | 0.1 |
| Example 14 | " | 70 | — | — | 20 | 20 | " | " | " |
| Example 15 | " | 70 | — | — | 30 | 10 | " | " | " |
| Example 16 | " | 25 | C | 25 | 20 | 30 | " | " | " |
| Example 17 | " | 40 | — | — | 50 | 10 | " | " | " |
| Example 18 | E | 40 | — | — | 50 | 10 | " | " | " |
| Example 19 | F | 40 | — | — | 50 | 10 | " | " | " |
| Example 20 | G | 40 | — | — | 50 | 10 | " | " | " |
| Example 21 | H | 40 | — | — | 50 | 10 | " | " | " |

TABLE 4

| No. of Example or Comparative Example | MFR g/10 min | Flexural Modulus (kg/cm²) | Izod Impact Strength[1] −20° C. notched | Weathering Resistance and Visual Appearance (Irradiation hours) | | | | | Coating Test Coating Adhesion Strength (g/cm width) |
|---|---|---|---|---|---|---|---|---|---|
| | | | | 250 | 500 | 750 | 1000 | 1500 | |
| Comparative Example 4 | 12.5 | 11500 | 7.5 | Δ | x | x | — | — | 0 |
| Comparative Example 5 | 12.5 | 11500 | 7.5 | ⊚ | ⊚ | x | x | — | 0 |
| Comparative Example 6 | 12.7 | 11400 | 7.8 | ⊚ | ⊚ | ⊚ | Δ | — | 0 |
| Example 11 | 18.3 | 10400 | 7.5 | | x | x | — | — | 870 |
| Example 12 | 18.3 | 10400 | 7.7 | ⊚ | ⊚ | ⊚ | ○ | x | 870 |
| Example 13 | 18.5 | 10200 | 7.7 | ⊚ | ⊚ | ⊚ | ⊚ | ○ | 870 |
| Example 14 | 21.0 | 9800 | 8.0 | ⊚ | ⊚ | ⊚ | ⊚ | ⊚ | 1050 |
| Example 15 | 24.7 | 9400 | 7.8 | ⊚ | ⊚ | ⊚ | ⊚ | ⊚ | 1350 |
| Example 16 | 12.7 | 6300 | 50 or more | ⊚ | ⊚ | ⊚ | ⊚ | ⊚ | 1500 |
| Example 17 | 45.1 | 7800 | 8.5 | ⊚ | ⊚ | ⊚ | ⊚ | ⊚ | 1400 |
| Example 18 | 20.1 | 7100 | 5.2 | ⊚ | ⊚ | ⊚ | ⊚ | ○ | 1400 |
| Example 19 | 80.1 | 9000 | 4.1 | ⊚ | ⊚ | ⊚ | ⊚ | ○ | 1500 |
| Example 20 | 26.3 | 12100 | 2.3 | ⊚ | ⊚ | ⊚ | ⊚ | ○ | 1150 |
| Example 21 | 30.0 | 8900 | 2.8 | ⊚ | ⊚ | ○ | ⊚ | ○ | 1100 |

[1]kg · cm/cm

TABLE 5

| No. of Example or Comparative Example | Propylene polymer Kind | Propylene polymer Amount (wt. parts) | Amount of Modified P.P.(A) (wt. parts) | EPR Amount (wt. part) | High-density Ethylene Polymer Kind | High-density Ethylene Polymer Amount (wt. part) | Talc (wt %) | Amount of Stabilizer (wt. parts) Stabilizer (A) | Amount of Stabilizer (wt. parts) Stabilizer (B) | Amount of Stabilizer (wt. parts) Stabilizer (C) |
|---|---|---|---|---|---|---|---|---|---|---|
| Example 22 | A | 70 | 10 | 10 | A | 10 | 0.3 | — | — | — |
| Example 23 | " | 70 | 10 | 10 | " | 10 | 0.3 | 0.05 | 0.05 | 0.10 |
| Example 24 | " | 70 | 10 | 10 | " | 10 | 0.3 | 0.15 | 0.15 | 0.15 |
| Example 25 | " | 60 | 20 | 10 | " | 10 | 0.3 | — | — | — |
| Example 26 | " | 50 | 30 | 10 | " | 10 | 0.3 | — | — | — |
| Example 27 | " | 30 | 50 | 10 | " | 10 | 0.3 | — | — | — |
| Example 28 | " | 40 | 20 | 30 | " | 10 | 0.3 | — | — | — |
| Example 29 | " | 60 | 20 | 10 | B | 10 | 0.3 | — | — | — |
| Example 30 | " | 60 | 20 | 10 | A | 10 | 0.3 | — | — | — |
| Example 31 | E | 30 | 50 | 10 | " | 10 | 0.3 | — | — | — |
| Example 32 | F | 30 | 50 | 10 | " | 10 | 0.3 | — | — | — |
| Example 33 | G | 30 | 50 | 10 | " | 10 | 0.3 | — | — | — |
| Example 34 | H | 30 | 50 | 10 | " | 10 | 0.3 | — | — | — |
| Comparative Example 7 | A | 80 | 0 | 10 | " | 10 | 0.3 | — | — | — |
| Comparative Example 8 | " | 80 | 0 | 10 | " | 10 | 0.3 | 0.05 | 0.05 | 0.10 |
| Comparative Example 9 | " | 80 | 0 | 10 | " | 10 | 0.3 | 0.15 | 0.15 | 0.15 |

TABLE 6

| No. of Example or Comparative Example | MFR g/10 min | Flexural Modulus (kg/cm$^2$) | Izod Impact Strength[1] −20° C. (notched) | Glossiness (60%) | Weathering Resistance and Visual Appearance Evaluation (Irradiation hours) 250 | 500 | 750 | 1000 | 1250 | 1500 | Coating Adhesion Strength (g/cm width) |
|---|---|---|---|---|---|---|---|---|---|---|---|
| Example 22 | 10.2 | 10,500 | 9.8 | 83 | Δ | x | — | — | — | — | 900 |
| Example 23 | 10.2 | 10,500 | 9.8 | 83 | ⊚ | ⊚ | x | — | — | — | 900 |
| Example 24 | 10.2 | 10,500 | 9.8 | 83 | ⊚ | ⊚ | ⊚ | ○ | x | — | 900 |
| Example 25 | 12.5 | 10,100 | 10.3 | 81 | ⊚ | ⊚ | ⊚ | ⊚ | ○ | x | 1170 |
| Example 26 | 13.7 | 9,800 | 10.8 | 81 | ⊚ | ⊚ | ⊚ | ⊚ | ⊚ | x | 1450 |
| Example 27 | 19.3 | 8,200 | 8.1 | 72 | ⊚ | ⊚ | ⊚ | ⊚ | ⊚ | Δ | 1500 or more |
| Example 28 | 10.7 | 6,600 | 50 or more | 84 | ⊚ | ⊚ | ⊚ | ⊚ | ⊚ | ○ | 1500 or more |
| Example 29 | 18.7 | 10,300 | 8.7 | 87 | ⊚ | ⊚ | ⊚ | ⊚ | ○ | Δ | 1150 |
| Example 30 | 16.0 | 10,200 | 9.2 | 87 | ⊚ | ⊚ | ⊚ | ⊚ | ⊚ | x | 1150 |
| Example 31 | 83.3 | 10,200 | 6.3 | 80 | ⊚ | ⊚ | ⊚ | ⊚ | ⊚ | x | 1100 or more |
| Example 32 | 16.5 | 7,000 | 7.0 | 70 | ⊚ | ⊚ | ⊚ | ⊚ | ⊚ | x | 1200 |
| Example 33 | 23.5 | 9,500 | 2.8 | 85 | ⊚ | ⊚ | ⊚ | ⊚ | ⊚ | x | 1200 |
| Example 34 | 21.6 | 6,500 | 4.2 | 83 | ⊚ | ⊚ | ⊚ | ⊚ | ⊚ | Δ | 1250 |
| Comparative Example 7 | 8.7 | 11,700 | 9.0 | 85 | x | — | — | — | — | — | 0 |
| Comparative Example 8 | 8.7 | 11,700 | 9.0 | 85 | ⊚ | ○ | x | — | — | — | 0 |
| Comparative Example 9 | 8.7 | 11,700 | 9.2 | 85 | ⊚ | ⊚ | ⊚ | Δ | x | — | 0 |

[1]kg · cm/cm

Examples 35 to 43 and Comoarative Examples 10 to 16

The propylene polymer compositions were prepared in the same manner as in Example 1, except that the propylene polyemers, the modified propylene polymer, the amorphous ethylene-propylene copolymer, and the inorganic fillers were used in the amounts listed in Table 7.

The results are shown in Table 8.

TABLE 7

| No. of Example or Comparative Example | Modified P.P.(A) (wt. parts) | Propylene Polymer (I) Kind | Propylene Polymer (I) Amount (wt. part) | Propylene Polymer (II) Kind | Propylene Polymer (II) Amount (wt. part) | EPR (wt. part) | Inorganic Filler Kind | Inorganic Filler Amount (wt. part) |
|---|---|---|---|---|---|---|---|---|
| Example 35 | 50 | A | 12 | — | 0 | 28 | Talc | 10 |
| Example 36 | 30 | " | 32 | — | 0 | 28 | Talc | 10 |
| Example 37 | 20 | " | 42 | — | 0 | 28 | Talc | 10 |
| Example 38 | 10 | B | 50 | — | 0 | 30 | Talc | 10 |
| Example 39 | 20 | C | 30 | B | 10 | 30 | Talc | 10 |
| Example 40 | 40 | B | 10 | — | 0 | 30 | CaCO$_3$ | 20 |
| Example 41 | 40 | " | 15 | — | 0 | 30 | CaCO$_3$ | 10[1] |
| Example 42 | 40 | " | 10 | — | 0 | 30 | Silica | 20 |
| Example 43 | 40 | " | 15 | — | 0 | 30 | Silica | 5[2] |
| Comparative Example 10 | 50 | " | 10 | — | 0 | 30 | Talc | 10 |
| Comparative Example 11 | 0 | " | 60 | — | 0 | 30 | Talc | 10 |
| Comparative Example 12 | 60 | — | 0 | — | 0 | 30 | Talc | 10 |

TABLE 7-continued

| No. of Example or Comparative Example | Modified P.P.(A) (wt. parts) | Propylene Polymer (I) Kind | Propylene Polymer (I) Amount (wt. part) | Propylene Polymer (II) Kind | Propylene Polymer (II) Amount (wt. part) | EPR (wt. part) | Inorganic Filler Kind | Inorganic Filler Amount (wt. part) |
|---|---|---|---|---|---|---|---|---|
| Comparative Example 13 | 50 | B | 40 | — | 0 | 0 | Talc | 10 |
| Comparative Example 14 | 50 | " | 20 | — | 0 | 30 | — | 0 |
| Comparative Example 15 | 50 | C | 10 | — | 0 | 30 | Talc | 10 |
| Comparative Example 16 | 5 | B | 55 | — | 0 | 30 | Talc | 10 |

[1] 5 parts by weight of talc was additionally incorporated
[2] 10 parts by weight of talc was additionally incorporated.

TABLE 8

| No. of Example or Comparative Example | MFR (g/10 min) | Flexural Modulus (kg/cm$^2$) | Izod Impact Strength[1] (−30° C.) (notched) | Coating Adhesion Strength (g/cm) |
|---|---|---|---|---|
| Example 35 | 13.2 | 7,100 | 11.8 | 2,000 or more |
| Example 36 | 9.1 | 8,400 | 9.6 | 1,600 |
| Example 37 | 6.8 | 8,700 | 8.1 | 1,470 |
| Example 38 | 7.0 | 9,700 | 11.1 | 1,150 |
| Example 39 | 9.5 | 10,100 | 9.4 | 1,370 |
| Example 40 | 10.5 | 9,100 | 9.6 | 1,320 |
| Example 41 | 10.8 | 9,000 | 10.3 | 1,530 |
| Example 42 | 7.1 | 8,200 | 8.0 | 1,500 |
| Example 43 | 8.5 | 8,500 | 10.2 | 1,650 |
| Comparative Example 10 | 14.3 | 8,100 | 11.2 | 2,000 or more |
| Comparative Example 11 | 8.6 | 11,800 | 13.7 | 0 |
| Comparative Example 12 | 16.7 | 7,300 | 10.1 | 2,000 or more |
| Comparative Example 13 | 28.3 | 13,500 | 3.7 | 730 |
| Comparative Example 14 | 16.0 | 6,400 | 35.0 | 2,000 or more |
| Comparative Example 15 | 13.5 | 9,500 | 7.5 | 2,000 or more |
| Comparative Example 16 | 9.0 | 10,600 | 12.5 | 800 |

[1] kg·cm/cm

Examples 44 to 51

The propylene polymer compositions were prepared in the same manner as in Example 1, except that the propylene polymers, the modified propylene polymer, the amorphous ethylene-propylene copolymer, and the inorganic filler in the amounts listed in Table 9 were used.

The results are shown in Table 10.

TABLE 9

| No. of Example or Comparative Example | Modified Propylene Polymer Kind | Modified Propylene Polymer Amount (wt. %) | Propylene Polymer (I) Kind | Propylene Polymer (I) Amount (wt. %) | Propylene Polymer (II) Kind | Propylene Polymer (II) Amount (wt. %) | Amount of EPR (wt. %) | Inorganic Filler Kind | Inorganic Filler Amount (wt. %) |
|---|---|---|---|---|---|---|---|---|---|
| Example 44 | Modified PP(B) | 10 | D | 16 | A | 33 | 31 | Talc | 10 |
| Example 45 | Modified PP(B) | 20 | " | 13 | " | 25 | 32 | Talc | 10 |
| Example 46 | Modified PP(B) | 30 | " | 11 | " | 16 | 33 | Talc | 10 |
| Example 47 | Modified PP(B) | 20 | C | 10 | " | 29 | 34 | Talc | 7 |
| Example 48 | Modified PP(B) | 30 | " | 12 | B | 10 | 33 | CaCO$_3$ | 15 |
| Example 49 | Modified PP(B) | " | " | 12 | " | 10 | 33 | CaCO$_3$ | 10[1] |
| Example 50 | Modified PP(B) | " | " | 20 | — | 0 | 35 | Wallastonite | 15 |
| Example 51 | Modified PP(B) | " | " | 20 | — | 0 | 35 | Wallastonite | 10[1] |

[1] 5% by weight of talc was further added.

TABLE 10

| No. of Example or Comparative Example | MFR (g/10 min) | Flexural Modulus (kg/cm$^2$) | Izod Impact Strength[1] −30° C. notched | Gloss (GS, %) | Coating Adhesion Strength (g/cm width) |
|---|---|---|---|---|---|
| Example 44 | 10.3 | 10,100 | 9.0 | 74 | 800 |
| Example 45 | 10.7 | 10,200 | 8.6 | 76 | 870 |
| Example 46 | 11.5 | 10,100 | 8.1 | 77 | 980 |
| Example 47 | 10.0 | 10,100 | 8.4 | 79 | 980 |
| Example 48 | 12.0 | 9,100 | 8.8 | 84 | 850 |
| Example 49 | 11.3 | 9,400 | 8.5 | 80 | 850 |

TABLE 10-continued

| No. of Example or Comparative Example | MFR (g/10 min) | Flexural Modulus (kg/cm²) | Izod Impact Strength[1] −30° C. notched | Gloss (GS, %) | Coating Adhesion Strength (g/cm width) |
|---|---|---|---|---|---|
| Example 50 | 9.0 | 10,800 | 7.2 | 68 | 820 |
| Example 51 | 9.7 | 10,100 | 8.0 | 71 | 820 |

[1]kg · cm/cm

Examples 52 to 59 and Comparative Example 19

The propylene polymer compositions were prepared in the same manner as in Example 1, except that the propylene polymers, the modified propylene polymer, the amorphous ethylene-propylene copolymer, and the inorganic filler in the amounts listed in Table 11 were used.

The results are shown in Table 12.

Examples 60 to 72 and Comparative Examples 20 to 23

The propylene polymer compositions were prepared in the same manner as in Example 1, except that the propylene polymers, the modified propylene polymer, and the inorganic filler in the amounts listed in Table 13 were used.

The results are shown in Table 14.

TABLE 11

| No. of Example or Comparative Example | Modified P.P.(B) Kind | Modified P.P.(B) Amount (wt. %) | Propylene Polymer (I) Kind | Propylene Polymer (I) Amount (wt. %) | Propylene Polymer (II) Kind | Propylene Polymer (II) Amount (wt. %) | Amount of EPR (wt. %) | Inorganic Filler Kind | Inorganic Filler Amount (wt. %) |
|---|---|---|---|---|---|---|---|---|---|
| Example 52 | C | 20 | C | 10 | B | 27 | 34 | Talc | 9 |
| Example 53 | A | 20 | " | 10 | " | 31 | 30 | Talc | 9 |
| Example 54 | D | 20 | " | 15 | " | 29 | 27 | Talc | 9 |
| Example 55 | A | 10 | D | 20 | A | 31 | 30 | Talc | 9 |
| Example 56 | " | 30 | " | 10 | " | 21 | 30 | Talc | 9 |
| Example 57 | " | 30 | C | 10 | B | 7 | 33 | Wollastonite | 20 |
| Example 58 | C | 30 | D | 10 | A | 7 | 33 | Wollastonite Talc | 15 5 |
| Example 59 | D | 20 | C | 10 | B | 25 | 30 | CaCO₃ | 15 |
| Comparative Example 19 | E | 20 | C | 15 | B | 21 | 20 | Talc | 9 |

TABLE 12

| No. of Example or Comparative Example | MFR (g/10 min) | Flexural Modulus (kg/cm²) | Izod Impact Strength[1] −30° C. notched | Glossiness (gloss, %) | Flow Mark Evaluation[2] | Coating Adhesion Strength (g/cm width) |
|---|---|---|---|---|---|---|
| Example 54 | 13.8 | 9,500 | 8.5 | 78 | ○ | 1,050 |
| Example 55 | 12.5 | 10,200 | 9.1 | 70 | ○ | 1,300 |
| Example 56 | 10.7 | 10,500 | 8.7 | 61 | ○ | 1,350 |
| Example 57 | 10.5 | 10,200 | 10.2 | 72 | ○ | 1,020 |
| Example 58 | 11.7 | 10,000 | 9.5 | 66 | ○ | 1,350 |
| Example 59 | 10.7 | 8,500 | 8.0 | 63 | ○ | 1,000 |
| Example 60 | 11.5 | 9,200 | 8.2 | 68 | ○ | 1,000 |
| Example 61 | 10.2 | 8,800 | 10.7 | 70 | ○ | 1,220 |
| Comparative Example 19 | 9.1 | 10,300 | 9.5 | 48 | Δ | 980 |

[1]kg · cm/cm
[2]Flow mark evaluation: ○ ... No flow mark, Δ ... Small flow mark, x ... Large flow mark

TABLE 13

| No. of Example or Comparative Example | Propylene Polymer Kind | Propylene Polymer Amount (wt. %) | Amount of Modified P.P. (A) (wt. %) | Amount of Talc (wt. %) | Amount of Stabilizer (wt. part) Stabilizer (A) | Amount of Stabilizer (wt. part) Stabilizer (B) | Amount of Stabilizer (wt. part) Stabilizer (C) |
|---|---|---|---|---|---|---|---|
| Example 60 | B | 80 | 10 | 10 | 0 | 0 | 0 |
| Example 61 | " | 80 | 10 | 10 | 0.05 | 0.05 | 0.1 |
| Example 62 | " | 80 | 10 | 10 | 0.15 | 0.15 | 0.1 |
| Example 63 | " | 60 | 10 | 30 | 0.15 | 0.15 | 0.1 |
| Example 64 | " | 70 | 20 | 10 | 0.15 | 0.15 | 0.1 |
| Example 65 | " | 60 | 30 | 10 | 0.15 | 0.15 | 0.1 |
| Example 66 | " | 40 | 50 | 10 | 0.15 | 0.15 | 0.1 |
| Example 67 | E | 40 | 50 | 10 | 0.15 | 0.15 | 0.1 |
| Example 68 | F | 40 | 50 | 10 | 0.15 | 0.15 | 0.1 |
| Example 69 | G | 40 | 50 | 10 | 0.15 | 0.15 | 0.1 |
| Example 70 | H | 40 | 50 | 10 | 0.15 | 0.15 | 0.1 |
| Example 71 | B | 70 | 20 | 20[1] | 0.15 | 0.15 | 0.1 |

TABLE 13-continued

| No. of Example or Comparative Example | Propylene Polymer Kind | Propylene Polymer Amount (wt. %) | Amount of Modified P.P. (A) (wt. %) | Amount of Talc (wt. %) | Amount of Stabilizer (wt. part) Stabilizer (A) | Amount of Stabilizer (wt. part) Stabilizer (B) | Amount of Stabilizer (wt. part) Stabilizer (C) |
|---|---|---|---|---|---|---|---|
| Example 72 | " | 70 | 20 | 20[2] | 0.15 | 0.15 | 0.1 |
| Comparative Example 20 | " | 90 | 0 | 10 | 0 | 0 | 0 |
| Comparative Example 21 | " | 90 | 0 | 10 | 0.05 | 0.05 | 0.1 |
| Comparative Example 22 | " | 90 | 0 | 10 | 0.15 | 0.15 | 0.1 |
| Comparative Example 23 | " | 70 | 0 | 30 | 0.15 | 0.15 | 0.1 |

[1] $CaCO_3$
[2] Wollastonite

TABLE 14

| No. of Example or Comparative Example | MFR g/10 min | Flexural Modulus (kg/cm$^2$) | Izod Impact Strength 23° C. notched | Weathering Resistance and Visual Appearance Evaluation (Irradiation hours) 200 | 300 | 500 | 750 | 1000 | Coating Test Coating Adhesion Strength (g/cm width) |
|---|---|---|---|---|---|---|---|---|---|
| Example 60 | 16.7 | 14,300 | 5.7 | ○ | x | x | — | — | 330 |
| Example 61 | 16.7 | 14,400 | 5.7 | ◎ | ◎ | x | x | — | 330 |
| Example 62 | 16.4 | 14,300 | 5.8 | ◎ | ◎ | ◎ | x | — | 330 |
| Example 63 | 14.8 | 26,500 | 4.0 | ◎ | ◎ | ○ | x | x | 300 |
| Example 64 | 20.2 | 14,000 | 6.4 | ◎ | ◎ | ◎ | ◎ | x | 400 |
| Example 65 | 25.2 | 13,500 | 7.0 | ◎ | ◎ | ◎ | ◎ | x | 490 |
| Example 66 | 34.1 | 12,300 | 7.8 | ◎ | ◎ | ◎ | x | x | 680 |
| Example 67 | 25.1 | 11,000 | 5.2 | ◎ | ◎ | ◎ | x | x | 600 |
| Example 68 | 95.7 | 14,700 | 2.8 | ◎ | ◎ | ○ | x | x | 710 |
| Example 69 | 27.6 | 13,600 | 3.5 | ◎ | ◎ | ○ | x | x | 380 |
| Example 70 | 30.5 | 10,000 | 4.1 | ◎ | ◎ | ◎ | x | x | 480 |
| Example 71 | 22.4 | 12,800 | 7.2 | ◎ | ◎ | ◎ | ◎ | x | 350 |
| Example 72 | 13.6 | 11,000 | 2.7 | ◎ | ◎ | x | x | x | 320 |
| Comparative Example 20 | 13.4 | 15,200 | 5.1 | x | x | — | — | — | 0 |
| Comparative Example 21 | 13.5 | 15,200 | 5.0 | ○ | x | x | — | — | 0 |
| Comparative Example 22 | 13.5 | 15,300 | 5.1 | ◎ | ○ | x | x | — | 0 |
| Comparative Example 23 | 12.1 | 27,600 | 3.1 | ◎ | Δ | x | x | — | 0 |

Examples 73 to 85 and Comparative Examples 24 to 26

The propylene polymer compositions were prepared in the same manner as in Example 1, except that the propylene polymers, the modified propylene polymer, the amorphous ethylene-propylene copolymer, and the inorganic filler in the amounts listed in Table 15 were used.

The results are shown in Table 16.

TABLE 15

| No. of Example or Comparative Example | Propylene Polymer Kind | Propylene Polymer Amount (wt. %) | Amount of Modified Propylene Polymer (wt. part) | Amount of Amorphous Ethylene-Propylene Copolymer (wt. part) | Talc (wt. part) | Amount of Stabilizer (wt. part) Stabilizer (A) | Amount of Stabilizer (wt. part) Stabilizer (B) | Amount of Stabilizer (wt. part) Stabilizer (C) |
|---|---|---|---|---|---|---|---|---|
| Example 73 | B | 70 | 10 | 10 | 10 | 0 | 0 | 0 |
| Example 74 | " | 70 | 10 | 10 | 10 | 0.05 | 0.05 | 0.10 |
| Example 75 | " | 70 | 10 | 10 | 10 | 0.15 | 0.15 | 0.10 |
| Example 76 | " | 60 | 20 | 10 | 10 | " | " | 0.10 |
| Example 77 | " | 50 | 30 | 10 | 10 | " | " | 0.10 |
| Example 78 | " | 30 | 50 | 10 | 10 | " | " | 0.10 |
| Example 79 | " | 30 | 50 | 10 | 10 | " | " | 0.10 |
| Example 80 | E | 30 | 50 | 10 | 10 | " | " | 0.10 |
| Example 81 | F | 30 | 50 | 10 | 10 | " | " | 0.10 |
| Example 82 | G | 30 | 50 | 10 | 10 | " | " | 0.10 |
| Example 83 | H | 75 | 10 | 5 | 10 | " | " | 0.10 |
| Example 84 | B | 70 | 10 | 10 | 10[1] | " | " | 0.10 |
| Example 85 | " | 70 | 10 | 10 | 10[2] | " | " | 0.10 |
| Comparative Example 24 | B | 80 | 0 | 10 | 10 | 0 | 0 | 0 |
| Comparative Example 25 | " | 80 | 0 | 10 | 10 | 0.05 | 0.05 | 0.10 |
| Comparative | " | 80 | 0 | 10 | 10 | 0.15 | 0.15 | 0.10 |

TABLE 15-continued

| No. of Example or Comparative Example | Propylene Polymer Kind | Propylene Polymer Amount (wt. %) | Amount of Modified Propylene Polymer (wt. part) | Amount of Amorphous Ethylene-Propylene Copolymer (wt. part) | Talc (wt. part) | Stabilizer (A) | Stabilizer (B) | Stabilizer (C) |
|---|---|---|---|---|---|---|---|---|
| Example 26 | | | | | | | | |

(1) CaCO₃
(2) Wollastonite

TABLE 16

| No. of Example or Comparative Example | MFR g/10 min | Flexural Modulus (kg/cm²) | Izod Impact Strength⁽¹⁾ −20° C. (notched) | Weathering Resistance and Visual Appearance Evaluation (Irradiation hours) 250 | 500 | 750 | 1250 | 1500 | Coating Adhesion Strength (g/cm · width) |
|---|---|---|---|---|---|---|---|---|---|
| Example 73 | 18.0 | 12,400 | 6.8 | Δ | x | x | — | — | 820 |
| Example 74 | 18.0 | 12,400 | 6.8 | ⊚ | ⊚ | ⊚ | Δ | x | 820 |
| Example 75 | 18.1 | 12,400 | 6.8 | ⊚ | ⊚ | ⊚ | ⊚ | ○ | 820 |
| Example 76 | 20.2 | 12,000 | 7.6 | ⊚ | ⊚ | ⊚ | ⊚ | ⊚ | 1050 |
| Example 77 | 23.8 | 11,500 | 8.3 | ⊚ | ⊚ | ⊚ | ⊚ | ⊚ | 1300 |
| Example 78 | 29.3 | 10,100 | 8.6 | ⊚ | ⊚ | ⊚ | ⊚ | ○ | 1420 |
| Example 79 | 21.5 | 9,200 | 5.7 | ⊚ | ⊚ | ⊚ | ⊚ | ○ | 1380 |
| Example 80 | 82.7 | 11,100 | 4.1 | ⊚ | ⊚ | ⊚ | ⊚ | ○ | 1420 |
| Example 81 | 21.7 | 12,000 | 4.9 | ⊚ | ⊚ | ⊚ | ⊚ | Δ | 1050 |
| Example 82 | 25.8 | 9,400 | 2.0 | ⊚ | ⊚ | ⊚ | ⊚ | Δ | 1100 |
| Example 83 | 20.4 | 13,300 | 2.2 | ⊚ | ⊚ | ⊚ | Δ | x | 780 |
| Example 84 | 18.2 | 10,800 | 7.4 | ⊚ | ⊚ | ⊚ | ○ | ○ | 840 |
| Example 85 | 14.1 | 9,800 | 4.2 | ⊚ | ⊚ | ○ | x | x | 710 |
| Comparative Example 24 | 12.3 | 12,900 | 6.2 | x | x | — | — | — | 0 |
| Comparative Example 25 | 12.3 | 13,000 | 6.2 | ⊚ | ○ | x | x | — | 0 |
| Comparative Example 26 | 12.1 | 12,900 | 6.4 | ⊚ | ⊚ | Δ | x | x | 0 |

(1) kg · cm/cm

Examples 86 to 101 and Comparative Examples 27 to 29

The propylene polymer compositions were prepared in the same manner as in Example 1, except that the propylene polymers, the modified propylene polymer, the ethylene-propylene copolymer rubber, the high-density ethylene polymer, and the inorganic filler in the amounts listed in Table 17 were used.

The results are shown in Table 18.

TABLE 17

| No. of Example or Comparative Example | Propylene Polymer Kind | Propylene Polymer Amount (wt %) | Modified P.P.(A) Amount (wt %) | Amount (wt %) | HDPE Kind | HDPE Amount (wt %) | Talc (wt %) | Weathering Stabilizer (A) | (B) | (C) |
|---|---|---|---|---|---|---|---|---|---|---|
| Comparative Example 27 | A | 70 | — | 10 | A | 10 | 10 | — | — | — |
| Comparative Example 28 | " | 70 | — | 10 | " | 10 | 10 | 0.05 | 0.05 | 0.1 |
| Comparative Example 29 | " | 70 | — | 10 | " | 10 | 10 | 0.15 | 0.15 | 0.1 |
| Example 86 | " | 60 | 10 | 10 | " | 10 | 10 | — | — | — |
| Example 87 | " | 60 | 10 | 10 | " | 10 | 10 | 0.05 | 0.05 | 0.1 |
| Example 88 | " | 60 | 10 | 10 | " | 10 | 10 | 0.15 | 0.15 | 0.1 |
| Example 89 | " | 50 | 20 | 10 | " | 10 | 10 | 0.15 | 0.15 | 0.1 |
| Example 90 | " | 40 | 30 | 10 | " | 10 | 10 | 0.15 | 0.15 | 0.1 |
| Example 91 | " | 10 | 20 | 30 | " | 10 | 10 | 0.15 | 0.15 | 0.1 |
| Example 92 | " | 20 | 40 | 20 | 10 | " | 10 | 10 | 0.15 | 0.15 | 0.1 |
| Example 93 | " | 30 | 20 | 10 | " | 10 | 10 | 0.15 | 0.15 | 0.1 |
| Example 94 | " | 50 | 20 | 10 | B | 10 | 10 | 0.15 | 0.15 | 0.1 |
| Example 95 | E | 20 | 50 | 10 | A | 10 | 10 | 0.15 | 0.15 | 0.1 |
| Example 96 | F | 20 | 50 | 10 | " | 10 | 10 | 0.15 | 0.15 | 0.1 |
| Example 97 | G | 20 | 50 | 10 | " | 10 | 10 | 0.15 | 0.15 | 0.1 |
| Example 98 | H | 20 | 50 | 10 | " | 10 | 10 | 0.15 | 0.15 | 0.1 |
| Example 99 | A | 30 | 20 | 10 | " | 10 | *1 30 | 0.15 | 0.15 | 0.1 |
| Example 100 | " | 30 | 20 | 10 | " | 10 | Talc 10 *1 20 | 0.15 | 0.15 | 0.1 |
| Example 101 | " | 40 | 20 | 10 | HDPE(A) | 10 | *2 20 | 0.15 | 0.15 | 0.1 |

*1 CaCO₃
*2 wollastonite

TABLE 18

| No. of Example or Comparative Example | MFR g/10 min | Flexural Modulus (kg/cm²) | Izod Impact Strength[1] −20° C. notched | Gloss (GS60°) | Weathering Resistance and Visual Appearance Evaluation (Irradiation hours) | | | | | | Coating Test Coating Adhesion Strength (g/min) |
|---|---|---|---|---|---|---|---|---|---|---|---|
| | | | | | 250 | 500 | 750 | 1000 | 1250 | 1500 | |
| Comparative Example 27 | 7.2 | 16200 | 9.2 | 75 | x | x | — | — | — | — | 0 |
| Comparative Example 28 | 7.4 | 16400 | 9.5 | 75 | ⊚ | | x | x | — | — | 0 |
| Comparative Example 29 | 7.2 | 16200 | 9.2 | 75 | ⊚ | ⊚ | ⊚ | x | x | x | 0 |
| Example 86 | 7.7 | 15700 | 10.1 | 72 | x | x | x | — | — | — | 600 |
| Example 87 | 7.7 | 15700 | 10.1 | 72 | ⊚ | ⊚ | x | x | — | — | 600 |
| Example 88 | 7.7 | 15700 | 10.1 | 72 | ⊚ | ⊚ | ⊚ | o | x | x | 600 |
| Example 89 | 11.4 | 15200 | 10.5 | 70 | ⊚ | ⊚ | ⊚ | ⊚ | o | x | 850 |
| Example 90 | 14.6 | 14900 | 10.8 | 68 | ⊚ | ⊚ | ⊚ | ⊚ | ⊚ | x | 1200 |
| Example 91 | 13.0 | 9200 | 50 or more | 65 | ⊚ | ⊚ | ⊚ | ⊚ | ⊚ | o | 1420 |
| Example 92 | 10.7 | 20000 | 8.7 | 55 | ⊚ | ⊚ | ⊚ | ⊚ | x | x | 620 |
| Example 93 | 9.2 | 27100 | 8.4 | 48 | ⊚ | ⊚ | ⊚ | ⊚ | x | x | 500 |
| Example 94 | 16.3 | 15500 | 8.7 | 80 | ⊚ | ⊚ | ⊚ | ⊚ | o | | 870 |
| Example 95 | 76.8 | 13100 | 6.0 | 75 | ⊚ | ⊚ | ⊚ | ⊚ | ⊚ | x | 1420 |
| Example 96 | 16.4 | 10600 | 6.8 | 62 | ⊚ | ⊚ | ⊚ | ⊚ | ⊚ | x | 1050 |
| Example 97 | 23.1 | 12600 | 2.5 | 76 | ⊚ | ⊚ | ⊚ | ⊚ | ⊚ | x | 1020 |
| Example 98 | 21.9 | 9000 | 3.9 | 74 | ⊚ | ⊚ | ⊚ | ⊚ | ⊚ | x | 1100 |
| Example 99 | 5.8 | 22500 | 4.3 | 75 | ⊚ | ⊚ | ⊚ | ⊚ | x | x | 470 |
| Example 100 | 7.3 | 24000 | 4.5 | 68 | ⊚ | ⊚ | ⊚ | ⊚ | x | x | 520 |
| Example 101 | 10.8 | 14200 | 9.2 | 35 | ⊚ | ⊚ | ⊚ | ⊚ | x | x | 800 |

[1] kg · cm/cm

Examples 102 to 114 and Comparative Examples 30 to 32

The propylene polymer compositions were prepared in the same manner as in Example 1, except that the propylene polymers, the modified propylene polymer, the high-density ethylene polymer, and the inorganic filler in the amounts listed in Table 19 were used. The results are shown in Table 20.

TABLE 19

| No. of Example or Comparative Example | Propylene Polymer Kind | Amount (wt %) | Modified P.P. (A) (wt %) | HDPE Kind | Amount (wt %) | Talc (wt %) | Weathering Resistant Stabilizer (A) | (B) | (C) |
|---|---|---|---|---|---|---|---|---|---|
| Comparative Example 30 | A | 90 | — | A | 10 | 0.3 | — | — | — |
| Comparative Example 31 | " | 90 | — | " | 10 | 0.3 | 0.05 | 0.05 | 0.10 |
| Comparative Example 32 | " | 90 | — | " | 10 | 0.3 | 0.15 | 0.15 | 0.15 |
| Example 102 | " | 80 | 10 | " | 10 | 0.3 | — | — | — |
| Example 103 | " | 80 | 10 | " | 10 | 0.3 | 0.05 | 0.05 | 0.10 |
| Example 104 | " | 80 | 10 | " | 10 | 0.3 | 0.15 | 0.15 | 0.15 |
| Example 105 | " | 70 | 20 | " | 10 | 0.3 | 0.15 | 0.15 | 0.15 |
| Example 106 | " | 60 | 30 | " | 10 | 0.3 | 0.15 | 0.15 | 0.15 |
| Example 107 | " | 40 | 50 | " | 10 | 0.3 | 0.15 | 0.15 | 0.15 |
| Example 108 | " | 75 | 20 | " | 5 | 0.3 | 0.15 | 0.15 | 0.15 |
| Example 109 | " | 65 | 20 | " | 15 | 0.3 | 0.15 | 0.15 | 0.15 |
| Example 110 | " | 70 | 20 | B | 10 | 0.3 | 0.15 | 0.15 | 0.15 |
| Example 111 | E | 40 | 50 | " | 10 | 0.3 | 0.15 | 0.15 | 0.15 |
| Example 112 | F | 40 | 50 | " | 10 | 0.3 | 0.15 | 0.15 | 0.15 |
| Example 113 | G | 40 | 50 | " | 10 | 0.3 | 0.15 | 0.15 | 0.15 |
| Example 114 | H | 40 | 50 | " | 10 | 0.3 | 0.15 | 0.15 | 0.15 |

TABLE 20

| No. of Example or Comparative Example | MFR (g/10 min) | Flexural Modulus (kg/cm²) | Izod Impact Strength[1] 23° C., notched | Weathering Resistance and Visual Appearance 83° C., Weather-O-Meter, Irradiation hours | | | | | | Coating Test Coating Adhesion Strength (g/cm width) | Gloss (GS 60°) |
|---|---|---|---|---|---|---|---|---|---|---|---|
| | | | | 250 | 500 | 750 | 1000 | 1250 | 1500 | | |
| Comparative Example 30 | 10.0 | 13000 | 9.0 | x | x | — | — | — | — | 0 | 75 |
| Comparative Example 31 | 10.0 | 12900 | 9.2 | o | x | x | x | — | — | 0 | 75 |
| Comparative Example 32 | 10.0 | 13000 | 9.0 | o | o | o | x | x | x | 0 | 75 |
| Example 102 | 15.8 | 12000 | 9.5 | x | x | x | — | — | — | 370 | 71 |
| Example 103 | 15.8 | 12000 | 9.5 | o | o | x | x | — | — | 370 | 71 |
| Example 104 | 16.0 | 12000 | 9.7 | o | o | o | Δ | x | x | 370 | 71 |
| Example 105 | 17.5 | 11800 | 10.4 | o | o | o | o | x | x | 450 | 70 |

TABLE 20-continued

| No. of Example or Comparative Example | MFR (g/10 min) | Flexural Modulus (kg/cm²) | Izod Impact Strength[1] 23° C., notched | Weathering Resistance and Visual Appearance 83° C., Weather-O-Meter, Irradiation hours | | | | | | Coating Test Coating Adhesion Strength (g/cm width) | Gloss (GS 60°) |
|---|---|---|---|---|---|---|---|---|---|---|---|
| | | | | 250 | 500 | 750 | 1000 | 1250 | 1500 | | |
| Example 106 | 20.6 | 11600 | 11.2 | ○ | ○ | ○ | ○ | ○ | x | 550 | 70 |
| Example 107 | 30.2 | 10100 | 7.6 | ○ | ○ | ○ | ○ | Δ | x | 800 | 68 |
| Example 108 | 18.7 | 12300 | 9.0 | ○ | ○ | ○ | ○ | x | x | 420 | 68 |
| Example 109 | 15.1 | 11600 | 15.7 | ○ | ○ | ○ | ○ | Δ | x | 460 | 71 |
| Example 110 | 21.2 | 12100 | 8.2 | ○ | ○ | ○ | ○ | x | x | 380 | 78 |
| Example 111 | 96.7 | 11200 | 3.6 | ○ | ● | ○ | ○ | x | x | 820 | 74 |
| Example 112 | 21.7 | 8000 | 6.2 | ○ | ○ | ○ | ○ | Δ | x | 800 | 65 |
| Example 113 | 29.7 | 10200 | 2.0 | ○ | ○ | ○ | ○ | x | x | 450 | 72 |
| Example 114 | 28.7 | 8000 | 3.2 | ○ | ○ | ○ | ○ | Δ | x | 530 | 72 |

Examples 115 to 127 and Comparative Examples 33 to 35

The propylene polymer compositions were prepared in the same manner as in Example 1, except that the propylene polymers, the modified propylene polymer, the ethylene-propylene copolymer rubber, the linear low-density ethylene copolymer, and the inorganic filler in the amounts listed in Table 21 were used.

The results are shown in Table 22.

TABLE 21

| No. of Example or Comparative Example | Propylene Polymer | | Amount of Modified P.P. (A) (wt. %) | Amount of EPR (wt. %) | Linear low-density ethylene copolymer | | Talc (wt. %) | Amount of Stabilizer (wt. parts) | | |
|---|---|---|---|---|---|---|---|---|---|---|
| | Kind | Amount (wt. %) | | | Kind | Amount (wt. %) | | Stabilizer (A) | Stabilizer (B) | Stabilizer (C) |
| Comparative Example 33 | A | 70 | — | 10 | A | 10 | 10 | 0 | 0 | 0 |
| Comparative Example 34 | " | 70 | — | 10 | A | 10 | 10 | 0.05 | 0.05 | 0.1 |
| Comparative Example 35 | " | 70 | — | 10 | A | 10 | 10 | 0.15 | 0.15 | 0.1 |
| Example 115 | " | 60 | 10 | 10 | A | 10 | 10 | 0 | 0 | 0 |
| Example 116 | " | 60 | 10 | 10 | A | 10 | 10 | 0.05 | 0.05 | 0.1 |
| Example 117 | " | 60 | 10 | 10 | A | 10 | 10 | 0.15 | 0.15 | 0.1 |
| Example 118 | " | 40 | 30 | 10 | A | 10 | 10 | 0.15 | 0.15 | 0.1 |
| Example 119 | B C | 20 23 | 15 | 25 | A | 10 | 7 | 0.15 | 0.15 | 0.1 |
| Example 120 | A | 65 | 10 | 10 | A | 5 | 10 | 0.15 | 0.15 | 0.1 |
| Example 121 | " | 20 | 50 | 10 | A | 10 | 10 | 0.15 | 0.15 | 0.1 |
| Example 122 | E | 20 | 50 | 10 | A | 10 | 10 | 0.15 | 0.15 | 0.1 |
| Example 123 | F | 20 | 50 | 10 | A | 10 | 10 | 0.15 | 0.15 | 0.1 |
| Example 124 | G | 20 | 50 | 10 | A | 10 | 10 | 0.15 | 0.15 | 0.1 |
| Example 125 | H | 20 | 50 | 10 | A | 10 | 10 | 0.15 | 0.15 | 0.1 |
| Example 126 | A | 55 | 10 | 10 | A | 10 | 15*1 | 0.15 | 0.15 | 0.1 |
| Example 127 | " | 55 | 10 | 10 | A | 10 | 15*2 | 0.15 | 0.15 | 0.1 |

*1 CaCO₃
*2 wollastonite

TABLE 22

| No. of Example or Comparative Example | MFR (g/10 min) | Flexural Modulus (kg/cm²) | Izod Impact Strength[1] −20° C., notched | Gloss GS (60%) | Weathering Resistance and Visual Appearance Evaluation (Irradiation hours) | | | | | | Coating Test Coating Adhesion Strength (g/cm · width) |
|---|---|---|---|---|---|---|---|---|---|---|---|
| | | | | | 250 | 500 | 750 | 1000 | 1250 | 1500 | |
| Comparative Example 33 | 6.2 | 13200 | 6.5 | 81 | x | x | — | — | — | — | — |
| Comparative Example 34 | 6.3 | 13200 | 6.5 | 81 | ◎ | ◎ | x | x | x | — | — |
| Comparative Example 35 | 6.2 | 13200 | 6.5 | 81 | ◎ | ◎ | ◎ | ○ | x | — | — |
| Example 115 | 11.8 | 12900 | 7.0 | 79 | Δ | x | x | — | — | — | 750 |
| Example 116 | 11.8 | 12900 | 6.9 | 79 | ◎ | ◎ | ◎ | ◎ | x | — | 750 |
| Example 117 | 11.7 | 12800 | 7.0 | 79 | ◎ | ◎ | ◎ | ◎ | ◎ | ◎ | 750 |
| Example 118 | 14.3 | 12200 | 7.6 | 76 | ◎ | ◎ | ◎ | ◎ | ◎ | ◎ | 1100 |
| Example 119 | 12.7 | 12200 | 50 or more | 70 | ◎ | ◎ | ◎ | ◎ | ◎ | ◎ | 1280 |
| Example 120 | 10.1 | 13300 | 6.6 | 71 | ◎ | ◎ | ◎ | ◎ | ◎ | ○ | 700 |
| Example 121 | 18.3 | 9800 | 5.4 | 63 | ◎ | ◎ | ◎ | ◎ | ◎ | ○ | 1250 |
| Example 122 | 72.4 | 10900 | 4.0 | 80 | ◎ | ◎ | ◎ | ◎ | ◎ | ○ | 1300 |
| Example 123 | 10.0 | 8100 | 5.4 | 68 | ◎ | ◎ | ◎ | ◎ | ◎ | Δ | 1300 |
| Example 124 | 15.3 | 12600 | 2.8 | 81 | ◎ | ◎ | ◎ | ◎ | ◎ | Δ | 1000 |
| Example 125 | 14.6 | 9800 | 3.2 | 79 | ◎ | ◎ | ◎ | ◎ | ◎ | ○ | 1050 |
| Example 126 | 11.8 | 15600 | 7.4 | 80 | ◎ | ◎ | ◎ | ◎ | ◎ | ○ | 780 |

TABLE 22-continued

| No. of Example or Comparative Example | MFR (g/10 min) | Flexural Modulus (kg/cm²) | Izod Impact Strength[1] −20° C., notched | Gloss GS (60%) | Weathering Resistance and Visual Appearance Evaluation (Irradiation hours) | | | | | | Coating Test Coating Adhesion Strength (g/cm · width) |
|---|---|---|---|---|---|---|---|---|---|---|---|
| | | | | | 250 | 500 | 750 | 1000 | 1250 | 1500 | |
| Example 127 | 6.3 | 10900 | 3.7 | 62 | ⊚ | ⊚ | ⊚ | x | x | x | 530 |

Examples 128 to 139 and Comparative Examples 36 to 38

The propylene polymer compositions were prepared in the same manner as in Example 1, except that the propylene polymers, the modified propylene polymer, and the linear low-density ethylene copolymer in the amounts listed in Table 23 were used.

The results are shown in Table 24.

Examples 140 to 153 and Comparative Examples 39 to 41

The propylene polymer compositions were prepared in the same manner as in Example 1, except that the propylene polymers, the modified propylene polymer, the linear low-density ethylene copolymer, and the inorganic filler in the amounts listed in Table 25 were used.

The results are shown in Table 26.

TABLE 23

| No. of Example or Comparative Example | Propylene Polymer | | Amount of Modified P.P.(A) (wt. %) | Linear low-density ethylene copolymer | | Amount of Stability (wt. parts) | | |
|---|---|---|---|---|---|---|---|---|
| | Kind | Amount (wt. %) | | Kind | Amount (wt. %) | Stabilizer (A) | Stabilizer (B) | Stabilizer (C) |
| Comparative Example 36 | A | 90 | — | A | 10 | 0 | 0 | 0 |
| Comparative Example 37 | " | 90 | — | " | 10 | 0.05 | 0.05 | 0.1 |
| Comparative Example 38 | " | 90 | — | " | 10 | 0.15 | 0.15 | 0.1 |
| Example 128 | " | 80 | 10 | " | 10 | 0 | 0 | 0 |
| Example 129 | " | 80 | 10 | " | 10 | 0.05 | 0.05 | 0.1 |
| Example 130 | " | 80 | 10 | " | 10 | 0.15 | 0.15 | 0.1 |
| Example 131 | " | 70 | 20 | " | 10 | 0.15 | 0.15 | 0.1 |
| Example 132 | " | 60 | 30 | " | 10 | 0.15 | 0.15 | 0.1 |
| Example 133 | " | 85 | 10 | " | 5 | 0.15 | 0.15 | 0.1 |
| Example 134 | " | 80 | 10 | B | 10 | 0.15 | 0.15 | 0.1 |
| Example 135 | " | 30 | 50 | A | 10 | 0.15 | 0.15 | 0.1 |
| Example 136 | E | 30 | 50 | " | 10 | 0.15 | 0.15 | 0.1 |
| Example 137 | F | 30 | 50 | " | 10 | 0.15 | 0.15 | 0.1 |
| Example 138 | G | 30 | 50 | " | 10 | 0.15 | 0.15 | 0.1 |
| Example 139 | H | 30 | 50 | " | 10 | 0.15 | 0.15 | 0.1 |

TABLE 24

| No. of Example or Comparative Example | MFR (g/10 min) | Flexural Modulus (kg/cm²) | Izod Impact Strength[1] 23° C., notched | Gloss GS (60%) | Weathering Resistance and Visual Appearance Evaluation | | | | | | Coating Test Coating Adhesion Strength (g/cm · width) |
|---|---|---|---|---|---|---|---|---|---|---|---|
| | | | | | 250 | 500 | 750 | 1000 | 1250 | 1500 | |
| Comparative Example 36 | 11.7 | 13200 | 9.8 | 73 | x | x | — | — | — | — | — |
| Comparative Example 37 | 11.7 | 13200 | 9.8 | 73 | ⊚ | ⊚ | x | x | — | — | — |
| Comparative Example 38 | 11.7 | 13200 | 9.8 | 73 | ⊚ | ⊚ | ⊚ | Δ | x | x | — |
| Example 128 | 12.8 | 12800 | 11.7 | 70 | Δ | x | x | — | — | — | 380 |
| Example 129 | 12.8 | 12800 | 11.7 | 71 | ⊚ | ⊚ | ⊚ | Δ | x | x | 380 |
| Example 130 | 12.8 | 12800 | 11.7 | 71 | ⊚ | ⊚ | ⊚ | ⊚ | ⊚ | Δ | 380 |
| Example 131 | 14.3 | 12300 | 12.8 | 68 | ⊚ | ⊚ | ⊚ | ⊚ | ⊚ | Δ | 460 |
| Example 132 | 16.8 | 11900 | 13.3 | 67 | ⊚ | ⊚ | ⊚ | ⊚ | ⊚ | Δ | 550 |
| Example 133 | 11.4 | 12200 | 10.3 | 62 | ⊚ | ⊚ | ⊚ | ⊚ | ⊚ | x | 420 |
| Example 134 | 14.5 | 13000 | 10.3 | 75 | ⊚ | ⊚ | ⊚ | ⊚ | ⊚ | Δ | 360 |
| Example 135 | 25.6 | 9500 | 8.0 | 61 | ⊚ | ⊚ | ⊚ | ⊚ | ○ | x | 770 |
| Example 136 | 85.0 | 11400 | 4.9 | 71 | ⊚ | ⊚ | ⊚ | ⊚ | ○ | x | 700 |
| Example 137 | 15.8 | 8000 | 5.8 | 57 | ⊚ | ⊚ | ⊚ | ⊚ | ○ | x | 300 |
| Example 138 | 23.8 | 17300 | 3.0 | 73 | ⊚ | ⊚ | ⊚ | ⊚ | Δ | x | 400 |
| Example 139 | 20.0 | 7800 | 4.4 | 70 | ⊚ | ⊚ | ⊚ | ⊚ | ○ | x | 480 |

TABLE 25

| No. of Example or Comparative Example | Propylene Polymer Kind | Propylene Polymer Amount (wt. %) | Amount of Modified P.P.(A) (wt. %) | Linear low-density ethylene copolymer Kind | Linear low-density ethylene copolymer Amount (wt. %) | Talc (wt. %) | Amount of Stability (wt. parts) Stabilizer (A) | Amount of Stability (wt. parts) Stabilizer (B) | Amount of Stability (wt. parts) Stabilizer (C) |
|---|---|---|---|---|---|---|---|---|---|
| Comparative Example 39 | A | 80 | — | A | 10 | 0 | 0 | 0 | 0 |
| Comparative Example 40 | " | 80 | — | A | 10 | 10 | 0.05 | 0.05 | 0.1 |
| Comparative Example 41 | " | 80 | — | A | 10 | 10 | 0.15 | 0.15 | 0.1 |
| Example 140 | " | 70 | 10 | A | 10 | 10 | 0 | 0 | 0 |
| Example 141 | " | 70 | 10 | A | 10 | 10 | 0.05 | 0.05 | 0.1 |
| Example 142 | " | 70 | 10 | A | 10 | 10 | 0.15 | 0.15 | 0.1 |
| Example 143 | " | 60 | 20 | A | 10 | 10 | 0.15 | 0.15 | 0.1 |
| Example 144 | " | 50 | 30 | A | 10 | 10 | 0.15 | 0.15 | 0.1 |
| Example 145 | " | 75 | 10 | A | 5 | 10 | 0.15 | 0.15 | 0.1 |
| Example 146 | " | 70 | 10 | B | 10 | 10 | 0.15 | 0.15 | 0.1 |
| Example 147 | " | 30 | 50 | A | 10 | 10 | 0.15 | 0.15 | 0.1 |
| Example 148 | E | 30 | 50 | A | 10 | 10 | 0.15 | 0.15 | 0.1 |
| Example 149 | F | 30 | 50 | A | 10 | 10 | 0.15 | 0.15 | 0.1 |
| Example 150 | G | 30 | 50 | A | 10 | 10 | 0.15 | 0.15 | 0.1 |
| Example 151 | H | 30 | 50 | A | 10 | 10 | 0.15 | 0.15 | 0.1 |
| Example 152 | A | 65 | 10 | A | 10 | 15*1 | 0.15 | 0.15 | 0.1 |
| Example 153 | " | 65 | 10 | A | 10 | 15*2 | 0.15 | 0.15 | 0.1 |

*1 CaCO$_3$
*2 wollastonite

TABLE 26

| No. of Example or Comparative Example | MFR (g/10 min) | Flexural Modulus (kg/cm$^2$) | Izod Impact Strength[1] 23° C. notched | Gloss GS (60%) | Weathering Resistance and Visual Appearance Evaluation 250 | 500 | 750 | 1000 | 1250 | 1500 | Coating Test Coating Adhesion Strength (g/cm · width) |
|---|---|---|---|---|---|---|---|---|---|---|---|
| Comparative Example 39 | 10.2 | 15500 | 12.5 | 66 | x | x | — | — | — | — | — |
| Comparative Example 40 | 10.2 | 15500 | 12.5 | 66 | ◉ | ◉ | x | x | — | — | — |
| Comparative Example 41 | 10.2 | 15500 | 12.5 | 66 | ◉ | ◉ | ◉ | x | x | — | — |
| Example 140 | 13.7 | 15000 | 14.0 | 64 | Δ | x | x | — | — | — | 300 |
| Example 141 | 13.7 | 15000 | 14.0 | 64 | ◉ | ◉ | ◉ | x | x | — | 300 |
| Example 142 | 13.7 | 15000 | 14.0 | 64 | ◉ | ◉ | ◉ | ◉ | ◉ | x | 300 |
| Example 143 | 15.2 | 14500 | 15.1 | 63 | ◉ | ◉ | ◉ | ◉ | ◉ | Δ | 390 |
| Example 144 | 16.0 | 14300 | 15.6 | 61 | ◉ | ◉ | ◉ | ◉ | ◉ | Δ | 440 |
| Example 145 | 11.0 | 15400 | 11.4 | 59 | ◉ | ◉ | ◉ | ◉ | ◉ | x | 280 |
| Example 146 | 14.3 | 15200 | 11.8 | 68 | ◉ | ◉ | ◉ | ◉ | ◉ | x | 280 |
| Example 147 | 23.7 | 11600 | 9.7 | 58 | ◉ | ◉ | ◉ | ◉ | ○ | x | 620 |
| Example 148 | 82.7 | 13600 | 6.5 | 68 | ◉ | ◉ | ◉ | ◉ | ○ | x | 580 |
| Example 149 | 14.9 | 10100 | 8.4 | 53 | ◉ | ◉ | ◉ | ◉ | ○ | x | 550 |
| Example 150 | 21.7 | 13500 | 3.7 | 70 | ◉ | ◉ | ◉ | ◉ | Δ | x | 350 |
| Example 151 | 19.3 | 9800 | 5.1 | 68 | ◉ | ◉ | ◉ | ◉ | ○ | x | 400 |
| Example 152 | 15.8 | 13800 | 14.6 | 71 | ◉ | ◉ | ◉ | ◉ | ◉ | x | 330 |
| Example 153 | 10.0 | 12900 | 8.0 | 49 | ◉ | ◉ | Δ | x | x | x | 280 |

Examples 154 to 167 and Comparative Examples 42 to 44

The propylene polymer compositions were prepared in the same manner as in Example 1, except that the propylene polymers, the modified propylene polymer, the high-density ethylene polymer, and the inorganic filler in the amounts listed in Table 27 were used.

The results are shown in Table 28.

TABLE 27

| No. of Example or Comparative Example | Propylene Polymer Kind | Propylene Polymer Amount (wt. %) | Amount of Modified P.P. (A) (wt. %) | High-density Ethylene Polymer Kind | High-density Ethylene Polymer Amount (wt. %) | Talc (wt. %) | Amount of Stabilizer (wt part) Stabilizer (A) | Amount of Stabilizer (wt part) Stabilizer (B) | Amount of Stabilizer (wt part) Stabilizer (C) |
|---|---|---|---|---|---|---|---|---|---|
| Comparative Example 42 | A | 80 | — | A | 10 | 10 | 0 | 0 | 0 |
| Comparative Example 43 | " | 80 | — | A | 10 | 10 | 0.05 | 0.05 | 0.1 |
| Comparative Example 44 | " | 80 | — | A | 10 | 10 | 0.15 | 0.15 | 0.1 |
| Example 154 | " | 70 | 10 | A | 10 | 10 | 0 | 0 | 0 |
| Example 155 | " | 70 | 10 | A | 10 | 10 | 0.05 | 0.05 | 0.1 |
| Example 156 | " | 70 | 10 | A | 10 | 10 | 0.15 | 0.15 | 0.1 |

TABLE 27-continued

| No. of Example or Comparative Example | Propylene Polymer Kind | Propylene Polymer Amount (wt. %) | Amount of Modified P.P. (A) (wt. %) | High-density Ethylene Polymer Kind | High-density Ethylene Polymer Amount (wt. %) | Talc (wt. %) | Amount of Stabilizer (wt part) Stabilizer (A) | Amount of Stabilizer (wt part) Stabilizer (B) | Amount of Stabilizer (wt part) Stabilizer (C) |
|---|---|---|---|---|---|---|---|---|---|
| Example 157 | " | 60 | 20 | A | 10 | 10 | 0.15 | 0.15 | 0.1 |
| Example 158 | " | 50 | 30 | A | 10 | 10 | 0.15 | 0.15 | 0.1 |
| Example 159 | " | 60 | 10 | A | 20 | 10 | 0.15 | 0.15 | 0.1 |
| Example 160 | " | 70 | 10 | A | 10 | 10 | 0.15 | 0.15 | 0.1 |
| Example 161 | " | 30 | 50 | A | 10 | 10 | 0.15 | 0.15 | 0.1 |
| Example 162 | E | 30 | 50 | A | 10 | 10 | 0.15 | 0.15 | 0.1 |
| Example 163 | F | 30 | 50 | A | 10 | 10 | 0.15 | 0.15 | 0.1 |
| Example 164 | G | 30 | 50 | A | 10 | 10 | 0.15 | 0.15 | 0.1 |
| Example 165 | H | 30 | 50 | A | 10 | 10 | 0.15 | 0.15 | 0.1 |
| Example 166 | A | 65 | 10 | A | 10 | 15*1 | 0.15 | 0.15 | 0.1 |
| Example 167 | " | 65 | 10 | A. | 10 | 15*2 | 0.15 | 0.15 | 0.1 |

*1 $CaCO_3$
*2 wollastonite

TABLE 28

| No. of Example or Comparative Example | MFR (g/10 min) | Flexural Modulus (kg/cm$^2$) | Izod Impact Strength$^{(1)}$ 23° C., notched | Gloss GS (60%) | Weathering Resistance and Visual Appearance Evaluation 250 | 500 | 750 | 1000 | 1250 | 1500 | Coating Test Coating Adhesion Strength (g/cm · width) |
|---|---|---|---|---|---|---|---|---|---|---|---|
| Comparative Example 42 | 7.8 | 15900 | 13.0 | 68 | x | x | — | — | — | — | — |
| Comparative Example 43 | 7.8 | 16000 | 13.0 | 68 | ◉ | Δ | x | x | — | — | — |
| Comparative Example 44 | 7.8 | 15900 | 13.0 | 68 | ◉ | ◉ | ◉ | x | x | — | — |
| Example 154 | 11.7 | 15500 | 14.8 | 66 | Δ | x | x | — | — | — | 300 |
| Example 155 | 11.7 | 15500 | 14.8 | 66 | ◉ | ◉ | ◉ | x | x | — | 300 |
| Example 156 | 11.7 | 15500 | 14.8 | 66 | ◉ | ◉ | ◉ | ◉ | ◉ | x | 300 |
| Example 157 | 12.2 | 15100 | 16.1 | 64 | ◉ | ◉ | ◉ | ◉ | ◉ | x | 400 |
| Example 158 | 14.3 | 14600 | 16.8 | 61 | ◉ | ◉ | ◉ | ◉ | ◉ | x | 440 |
| Example 159 | 9.2 | 15100 | 33.7 | 60 | ◉ | ◉ | ◉ | ◉ | ◉ | x | 300 |
| Example 160 | 16.3 | 15600 | 9.7 | 70 | ◉ | ◉ | ◉ | ◉ | ◉ | x | 290 |
| Example 161 | 21.2 | 12200 | 10.0 | 60 | ◉ | ◉ | ◉ | ◉ | ○ | x | 650 |
| Example 162 | 74.9 | 13800 | 7.0 | 69 | ◉ | ◉ | ◉ | ◉ | Δ | x | 600 |
| Example 163 | 14.3 | 10500 | 8.9 | 53 | ◉ | ◉ | ◉ | ◉ | ○ | x | 580 |
| Example 164 | 19.7 | 13800 | 4.3 | 71 | ◉ | ◉ | ◉ | ◉ | Δ | x | 400 |
| Example 165 | 18.8 | 10200 | 5.8 | 68 | ◉ | ◉ | ◉ | ◉ | ◉ | x | 400 |
| Example 166 | 15.2 | 14200 | 15.0 | 73 | ◉ | ◉ | ◉ | ◉ | ◉ | x | 350 |
| Example 167 | 9.7 | 13300 | 8.8 | 50 | ◉ | ◉ | x | x | x | — | 300 |

Examples 168 to 181 and Comparative Examples 45 to 47

The propylene polymer compositions were prepared in the same manner as in Example 1, except that the propylene polymers, the modified propylene polymer, the ethylene-propylene copolymer rubber, the high-density ethylene polymer, the linear low-density ethylene copolymer, and the inorganic filler in the amounts listed in Table 29 were used.

The results are shown in Table 30.

TABLE 29

| No. of Example or Comparative Example | Propylene polymer Kind | Propylene polymer Amount (wt. %) | Amount of Modified P.P. (A) (wt. %) | Amount of EPR (wt. %) | High-density Ethylene Polymer Kind | High-density Ethylene Polymer Amount (wt. %) | Linear low-density ethylene copolymer Kind | Linear low-density ethylene copolymer Amount (wt. %) | Talc (wt %) | Amount of Stabilizer (wt. parts) Stabilizer (A) | Amount of Stabilizer (wt. parts) Stabilizer (B) | Amount of Stabilizer (wt. parts) Stabilizer (C) |
|---|---|---|---|---|---|---|---|---|---|---|---|---|
| Comparative Example 45 | A | 70 | — | 10 | A | 5 | A | 5 | 10 | 0 | 0 | 0 |
| Comparative Example 46 | " | 70 | — | 10 | A | 5 | A | 5 | 10 | 0.05 | 0.05 | 0.1 |
| Comparative Example 47 | " | 70 | — | 10 | A | 5 | A | 5 | 10 | 0.15 | 0.15 | 0.1 |
| Example 168 | " | 60 | 10 | 10 | A | 5 | A | 5 | 10 | 0 | 0 | 0 |
| Example 169 | " | 60 | 10 | 10 | A | 5 | A | 5 | 10 | 0.05 | 0.05 | 0.1 |
| Example 170 | " | 60 | 10 | 10 | A | 5 | A | 5 | 10 | 0.15 | 0.15 | 0.1 |
| Example 171 | " | 60 | 30 | 10 | A | 5 | A | 5 | 10 | 0.15 | 0.15 | 0.1 |
| Example 172 | " | 55 | 10 | 10 | A | 10 | A | 5 | 10 | 0.15 | 0.15 | 0.1 |
| Example 173 | " | 55 | 10 | 10 | A | 5 | A | 10 | 10 | 0.15 | 0.15 | 0.1 |
| Example 174 | B C | 23 20 | 15 | 25 | A | 5 | A | 5 | 7 | 0.15 | 0.15 | 0.1 |
| Example 175 | A | 20 | 50 | 10 | A | 5 | A | 5 | 10 | 0.15 | 0.15 | 0.1 |
| Example 176 | E | 20 | 50 | 10 | A | 5 | A | 5 | 10 | 0.15 | 0.15 | 0.1 |

TABLE 29-continued

| No. of Example or Comparative Example | Propylene polymer Kind | Propylene polymer Amount (wt. %) | Amount of Modified P.P. (A) (wt. %) | Amount of EPR (wt. %) | High-density Ethylene Polymer Kind | High-density Ethylene Polymer Amount (wt. %) | Linear low-density ethylene copolymer Kind | Linear low-density ethylene copolymer Amount (wt. %) | Talc (wt %) | Amount of Stabilizer (wt. parts) Stabilizer (A) | Amount of Stabilizer (wt. parts) Stabilizer (B) | Amount of Stabilizer (wt. parts) Stabilizer (C) |
|---|---|---|---|---|---|---|---|---|---|---|---|---|
| Example 177 | F | 20 | 50 | 10 | A | 5 | A | 5 | 10 | 0.15 | 0.15 | 0.1 |
| Example 178 | G | 20 | 50 | 10 | A | 5 | A | 5 | 10 | 0.15 | 0.15 | 0.1 |
| Example 179 | H | 20 | 50 | 10 | A | 5 | A | 5 | 10 | 0.15 | 0.15 | 0.1 |
| Example 180 | A | 55 | 10 | 10 | A | 5 | A | 5 | 15*1 | 0.15 | 0.15 | 0.1 |
| Example 181 | " | 55 | 10 | 10 | A | 5 | A | 5 | 15*2 | 0.15 | 0.15 | 0.1 |

*1 CaCO$_3$
*2 wollastonite

TABLE 30

| No. of Example or Comparative Example | MFR (g/10 min) | Flexural Modulus (kg/cm$^2$) | Izod Impact Strength[1] −20° C. notched | Gloss GS (60%) | Weathering Resistance and Visual Appearance Evaluation 250 | 500 | 750 | 1000 | 1250 | 1500 | Coating Test Coating Adhesion Strength |
|---|---|---|---|---|---|---|---|---|---|---|---|
| Comparative Example 45 | 8.8 | 13700 | 7.8 | 80 | x | x | — | — | — | — | — |
| Comparative Example 46 | 8.8 | 13700 | 7.8 | 80 | ⊚ | ○ | x | x | — | — | — |
| Comparative Example 47 | 8.8 | 13700 | 7.8 | 80 | ⊚ | ⊚ | ⊚ | △ | x | x | — |
| Example 168 | 10.5 | 13300 | 8.2 | 77 | △ | x | x | — | — | — | 750 |
| Example 169 | 10.5 | 13300 | 8.2 | 77 | ⊚ | ⊚ | ⊚ | x | x | — | 750 |
| Example 170 | 10.5 | 13300 | 8.2 | 77 | ⊚ | ⊚ | ⊚ | ⊚ | ⊚ | x | 750 |
| Example 171 | 15.0 | 11600 | 9.6 | 75 | ⊚ | ⊚ | ⊚ | ⊚ | ⊚ | x | 1050 |
| Example 172 | 9.7 | 12600 | 8.8 | 78 | ⊚ | ⊚ | ⊚ | ⊚ | ⊚ | x | 700 |
| Example 173 | 10.8 | 12400 | 8.4 | 78 | ⊚ | ⊚ | ⊚ | ⊚ | ⊚ | x | 700 |
| Example 174 | 14.8 | 12000 | 50 or more | 70 | ⊚ | ⊚ | ⊚ | ⊚ | ⊚ | x | 1250 |
| Example 175 | 18.2 | 9800 | 7.0 | 60 | ⊚ | ⊚ | ⊚ | ⊚ | ○ | x | 1350 |
| Example 176 | 78.3 | 12100 | 5.8 | 75 | ⊚ | ⊚ | ⊚ | ⊚ | ○ | x | 1380 |
| Example 177 | 15.5 | 8800 | 6.6 | 68 | ⊚ | ⊚ | ⊚ | ⊚ | ○ | x | 1300 |
| Example 178 | 22.9 | 11400 | 2.7 | 80 | ⊚ | ⊚ | ⊚ | ⊚ | △ | x | 1050 |
| Example 179 | 21.8 | 8400 | 3.5 | 78 | ⊚ | ⊚ | ⊚ | ⊚ | ○ | ○ x | 1000 |
| Example 180 | 8.8 | 12200 | 8.6 | 80 | ⊚ | ⊚ | ⊚ | ⊚ | ○ | x | 800 |
| Example 181 | 5.3 | 11900 | 4.4 | 63 | ⊚ | ⊚ | ⊚ | x | x | — | 560 |

Examples 182 to 194 and Comparative Examples 48 to 50

The propylene polymer compositions were prepared in the same manner as in Example 1, except that the propylene polymers, the modified propylene polymer, the ethylene-propylene copolymer rubber, the high-density ethylene polymer, and the linear low-density ethylene copolymer in the amounts listed in Table 31 were used.

The results are shown in Table 32.

TABLE 31

| No. of Example or Comparative Example | Propylene polymer Kind | Propylene polymer Amount (wt. %) | Amount of Modified P.P.(A) (wt. %) | Amount of EPR (wt. %) | High-density Ethylene Polymer Kind | High-density Ethylene Polymer Amount (wt. %) | Linear low-density ethylene copolymer Kind | Linear low-density ethylene copolymer Amount (wt. %) | Amount of Stabilizer (wt. parts) Stabilizer (A) | Amount of Stabilizer (wt. parts) Stabilizer (B) | Amount of Stabilizer (wt. parts) Stabilizer (C) |
|---|---|---|---|---|---|---|---|---|---|---|---|
| Comparative Example 48 | A | 80 | — | 10 | A | 5 | A | 5 | 0 | 0 | 0 |
| Comparative Example 49 | " | 80 | — | 10 | " | 5 | " | 5 | 0.05 | 0.05 | 0.1 |
| Comparative Example 50 | " | 80 | — | 10 | " | 5 | " | 5 | 0.15 | 0.15 | 0.1 |
| Example 182 | " | 70 | 10 | 10 | " | 5 | " | 5 | 0 | 0 | 0 |
| Example 183 | " | 70 | 10 | 10 | " | 5 | " | 5 | 0.05 | 0.05 | 0.1 |
| Example 184 | " | 70 | 10 | 10 | " | 5 | " | 5 | 0.15 | 0.15 | 0.1 |
| Example 185 | " | 60 | 20 | 10 | " | 5 | " | 5 | 0.15 | 0.15 | 0.1 |
| Example 186 | " | 50 | 30 | 10 | " | 5 | " | 5 | 0.15 | 0.15 | 0.1 |
| Example 187 | B C | 30 20 | 15 | 25 | " | 5 | " | 5 | 0.15 | 0.15 | 0.1 |
| Example 188 | A | 75 | 10 | 10 | " | 10 | " | 5 | 0.15 | 0.15 | 0.1 |
| Example 189 | " | 75 | 10 | 10 | " | 5 | " | 10 | 0.15 | 0.15 | 0.1 |
| Example 190 | " | 30 | 50 | 10 | " | 5 | " | 5 | 0.15 | 0.15 | 0.1 |
| Example 191 | E | 30 | 50 | 10 | " | 5 | " | 5 | 0.15 | 0.15 | 0.1 |
| Example 192 | F | 30 | 50 | 10 | " | 5 | " | 5 | 0.15 | 0.15 | 0.1 |
| Example 193 | G | 30 | 50 | 10 | " | 5 | " | 5 | 0.15 | 0.15 | 0.1 |
| Example 194 | H | 30 | 50 | 10 | " | 5 | " | 5 | 0.15 | 0.15 | 0.1 |

TABLE 32

| No. of Example or Comparative Example | MFR (g/10 min) | Flexural Modulus (kg/cm²) | Izod Impact Strength[1] −20° C. notched | Gloss GS (60%) | Weathering Resistance and Visual Appearance Evaluation | | | | | | Coating Test Coating Adhesion Strength (g/cm · width) |
|---|---|---|---|---|---|---|---|---|---|---|---|
| | | | | | 250 | 500 | 750 | 1000 | 1250 | 1500 | |
| Comparative Example 48 | 9.2 | 11500 | 8.1 | 87 | x | x | — | — | — | — | — |
| Comparative Example 49 | 9.2 | 11500 | 8.1 | 87 | ◎ | ○ | x | x | — | — | — |
| Comparative Example 50 | 9.2 | 11500 | 8.1 | 87 | ◎ | ◎ | ◎ | ○ | x | x | — |
| Example 182 | 10.7 | 11000 | 8.8 | 84 | Δ | x | x | — | — | — | 900 |
| Example 183 | 10.7 | 11000 | 8.8 | 84 | ◎ | ◎ | ◎ | ○ | x | x | 900 |
| Example 184 | 10.7 | 11000 | 8.8 | 84 | ◎ | ◎ | ◎ | ◎ | ◎ | x | 900 |
| Example 185 | 13.0 | 10500 | 9.6 | 83 | ◎ | ◎ | ◎ | ◎ | ◎ | | 1200 |
| Example 186 | 19.2 | 10200 | 10.1 | 83 | ◎ | ◎ | ◎ | ◎ | ◎ | | 1440 |
| Example 187 | 13.7 | 7800 | 50 or more | 75 | ◎ | ◎ | ◎ | ◎ | ◎ | | 1500 or more |
| Example 188 | 10.3 | 10600 | 9.8 | 87 | ◎ | ◎ | ◎ | ◎ | ◎ | Δ | 880 |
| Example 189 | 11.0 | 10300 | 8.7 | 89 | ◎ | ◎ | ◎ | ◎ | ◎ | x | 900 |
| Example 190 | 19.8 | 7800 | 7.2 | 74 | ◎ | ◎ | ◎ | ◎ | ◎ | x | 1500 or more |
| Example 191 | 83.6 | 10000 | 6.0 | 81 | ◎ | ◎ | ◎ | ◎ | ◎ | x | 1500 or more |
| Example 192 | 16.8 | 6800 | 6.8 | 72 | ○ | ◎ | ◎ | ◎ | ◎ | x | 1300 |
| Example 193 | 24.0 | 9400 | 2.7 | 89 | ○ | ◎ | ◎ | ◎ | ◎ | x | 1150 |
| Example 194 | 24.0 | 6400 | 3.8 | 84 | ○ | ◎ | ◎ | ◎ | ◎ | x | 1250 |

Reference Example 1

The weathering resistant properties of ethylene-propylene block copolymer having an ethylene content of 8.8% by weight and an MFR of 15 g/10 min and the modified propylene polymer obtained by modifying this propylene polymer as mentioned above. The compositions were comparatively evaluated in the same manner as in Example 1.

The results are as follows.

TABLE 34

| Polymer | Weathering Resistant Stabilizer | | Weathering Resistance and Visual Appearance Evaluation (hrs) | | |
|---|---|---|---|---|---|
| | Stabilizer (A) | Stabilizer (B) | 100 | 300 | 500 |
| Propylene copolymer | 0 | 0 | ○ | x | — |
| Propylene copolymer | 0.05 | 0.05 | ○ | ○ | Δ |
| Modified propylene copolymer | 0 | 0 | ○ | x | — |
| Modified propylene copolymer | 0.05 | 0.05 | ○ | ○ | Δ |

We claim:

1. A propylene polymer composition comprising:
(A) a modified propylene polymer obtained by treating:
  (1) 100 parts by weight of a propylene homopolymer or a mixture of a propylene homopolymer and an etheylene-propylene copolymer rubber, said mixture having an ethylene-propylene copolymer rubber content of 40% by weight of less, with
  (2) 0.1 to 50 parts by weight of an organic compound having at least one unsaturated bond in the molecule and a hydroxyl group and
  (3) 0.01 to 20 parts by weight of an organic peroxide;
(B) an unmodified propylene polymer;
(C) an ethylene-propylene copolymer rubber having a propylene content of 20% to 50% by weight and a Mooney viscosity $ML_{1+4}$ at 100° C. of 20 to 100, and
(F) an inorganic filler;
the content of the component (A) being 7% to 40% by weight based on the components (A), (B), (C), and (F), the weight ratio of the component (A) (2) to the components (A), (B), and (C) being 0.01% to 10% by weight, the content of the component (B) based on the components (A), (B), and (C) being at least 15% by weight, the content of the components (A), (B) and (C) being 3% to 35% by weight, and the content of the component (F) based on the components (A), (B), (C), and (F) being 2% to 40% by weight.

2. A propylene polymer composition as claimed in claim 1, wherein said unmodified propylene polymer is a propylene homopolymer, a propylene block copolymer composed of propylene as a major component with ethylene and/or an α-olefin, or a propylene random copolymer composed of propylene as a major component with ethylene and/or an α-olefin.

3. A propylene polymer composition as claimed in claim 1 further comprising (D) a high-density ethylene polymer having a density of 0.935 g/cm³ or more and a melt flow rate of 0.1 to 100 g/min, the content of the component (D) in the composition being 3% to 25% by weight, the weight ratio of the component (B) in the composition being at least 15% weight, and the weight ratio of the component (A) (2) to the total composition being 0.01% to 10% by weight.

4. A propylene polymer composition as claimed in claim 3, wherein said composition further comprises (E) 3% to 25% by weight, based on the weight of the composition, of a linear low-density ethylene copolymer having a density of not less than 0.900 g/cm³ but less than 0.935 g/cm³, a melting point of 106° C. to 130° C., and a melt flow rate of 0.1 to 100 g/10 min. and substantially having 3 to 35, based on 1,000 carbon atoms of the backbone carbon chain, of the side-chain alkyl groups having 1 to 10 carbon atoms.

5. A propylene polymer composition as claimed in claim 1 further comprising (E) a linear low-density ethylene copolymer having a density of not less than 0.90 g/cm³ but less than 0.935 g/cm³, a melting point of 106° C. to 130° C., and a melt flow rate of 0.1 to g/10 min. and substantially having 3 to 35, based on 1,000 carbon atoms of the backbone carbon chain, of the side-chain alkyl groups having 1 to 10 carbon atoms, the content of the component (E) in the composition being 3% to 25% by weight, the weight ratio of the component (B) in the composition being at least 15% by weight, and the weight ratio of the component (A) (2) to the total composition being 0.01% to 10% by weight.

* * * * *